United States Patent
Takahashi

(10) Patent No.: US 8,115,161 B2
(45) Date of Patent: Feb. 14, 2012

(54) IMAGING APPARATUS FOR TAKING IMAGES OF OBJECTS IN A PLURALITY OF DIRECTIONS AND VEHICLE INCORPORATING THE SAME

(75) Inventor: Koichi Takahashi, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 431 days.

(21) Appl. No.: 12/380,234

(22) Filed: Feb. 24, 2009

(65) Prior Publication Data
US 2009/0212202 A1 Aug. 27, 2009

(30) Foreign Application Priority Data
Feb. 26, 2008 (JP) ................................. 2008-044465

(51) Int. Cl.
*H01J 3/14* (2006.01)
*H01J 5/16* (2006.01)

(52) U.S. Cl. ....................... 250/216; 250/208.1; 348/148

(58) Field of Classification Search ............... 250/208.1, 250/216, 214.1, 214 R; 348/369, 42, 49, 348/51, 148, 333.08, 333.09, 333.1, 341; 359/629–638
See application file for complete search history.

(56) References Cited

U.S. PATENT DOCUMENTS

| | | | |
|---|---|---|---|
| 6,046,766 A | 4/2000 | Sakata | |
| 6,084,715 A * | 7/2000 | Aoki et al. | 359/627 |
| 6,166,764 A | 12/2000 | Sakata | |
| 6,178,048 B1 * | 1/2001 | Togino et al. | 359/637 |
| 6,472,995 B2 * | 10/2002 | Imoto | 340/815.4 |
| 2006/0077578 A1 * | 4/2006 | Shimo et al. | 359/834 |
| 2008/0291531 A1 * | 11/2008 | Heimer | 359/351 |

FOREIGN PATENT DOCUMENTS

| | | |
|---|---|---|
| JP | 10-229512 | 8/1998 |
| JP | 10-287176 | 10/1998 |
| JP | 2000-89301 | 3/2000 |
| JP | 2004-341509 | 12/2004 |

* cited by examiner

*Primary Examiner* — Francis M Legasse, Jr.
(74) *Attorney, Agent, or Firm* — Kenyon & Kenyon LLP

(57) ABSTRACT

The invention relates to an imaging apparatus that is capable of taking images of objects in at least three directions on a single imaging device, has a wide imaging angle of view and can easily be made compact, and a vehicle incorporating it. The imaging apparatus comprises a single imaging device 30 and at least three imaging optical systems 101, 102 and 103 that are located in juxtaposition to form on an imaging plane of the imaging device 30 at least three images in varying imaging directions. Of the three imaging optical systems 101, 102 and 103, at least two 101 and 102 reflect axial chief rays from objects in the right-and-left direction intersecting the direction of juxtaposition, and each have a curved reflecting surface of concave shape.

22 Claims, 14 Drawing Sheets

IMAGING APPARATUS FOR TAKING IMAGES OF OBJECTS IN A PLURALITY OF DIRECTIONS AND VEHICLE INCORPORATING THE SAME

BACKGROUND OF THE INVENTION

The present invention relates generally to an imaging apparatus for taking images of objects in a plurality of directions and a vehicle incorporating the same, and more particularly to an imaging apparatus capable of taking images of objects in different imaging directions on a single imaging device and a vehicle incorporating the same.

Among already known onboard cameras capable of simultaneously viewing images in three directions (right, left and down directions), there is an imaging apparatus wherein images in the right and left directions and images in the down direction are arranged on the same imaging plane with one or two prisms provided in front of an imaging lens (see Patent Publications 1 and 2).

[Patent Publication 1]
JP(A)2000-89301
[Patent Publication 2]
JP(A)2004-341509

With the conventional imaging apparatus capable of taking images of objects in two or the right and left directions with a reflecting prism provided in front of the imaging lens, however, the angles of view in the right and left directions become inevitably narrow because the angle of view of the imaging lens is divided into two equal parts: one for taking images in the left direction and another for taking images in the right direction.

Due to the construction wherein the reflecting prism(s) for viewing images in the right and left directions is provided in front of the imaging optical system, the optical system grows bulky. In addition, the separate location of the reflecting prism from the imaging optical system works disadvantageously against cost.

SUMMARY OF THE INVENTION

The situations being like this, an object of the present invention is to provide an imaging apparatus adapted to take images of objects in at least three directions, which has a wider imaging angle of view and can easily be made compact, and a vehicle incorporating the same.

The present invention provides an imaging apparatus adapted to take images of objects in a plurality of directions, characterized by comprising:

a single imaging device, and at least three imaging optical systems located in juxtaposition to form at least three images on an imaging plane of said single imaging device in different imaging directions, wherein:

of said at least three imaging optical systems, at least two each comprise a curved reflecting surface of concave shape that reflects light rays from objects in a right-and-left direction intersecting a direction of juxtaposition of said juxtaposed optical systems.

With such inventive arrangement, images of objects associated with the three or more parallel stacked imaging optical systems are formed parallel on the imaging plane of the single imaging device.

There is then an image having a wide angle of view obtained in the right-and-left direction (e.g. horizontal) intersecting the direction of juxtaposition of images (e.g., the direction vertical to the ground).

And at least two imaging optical systems each include a reflecting surface for reflecting light rays from the right-and-left imaging direction intersecting the direction of juxtaposition of those imaging optical systems, so that light rays from the right-and-left direction having a wide angle of view can be guided to the imaging plane. There is thus an imaging apparatus obtained that provides a solution of the problems with the prior art and has a wide angle of view in the right-and-left direction.

For instance, when this inventive imaging apparatus capable of taking images of objects in multiple directions is used as an onboard camera, it is then possible to obtain images from the right and left directions having a wide angle of view in the horizontal direction with respect to a road surface.

And if the reflecting surface adapted to reflect the axial chief ray is configured into a curved reflecting surface, it then allows this reflecting surface to have positive optical power, working for size reductions.

The respective imaging optical systems may have a partially common part such as a lens that is common to them and located just in front of the imaging plane.

Further, it is preferable to rely upon any one of the following arrangements.

Said curved reflecting surfaces of concave shape in said at least two imaging optical systems are each in an irrotational symmetric, aspheric shape.

Such arrangement works more for reductions in aberrations resulting from decentered reflection as compared with a rotationally symmetric reflecting surface. For instance, as the curved reflecting surface of rotational symmetry is decentered with respect to an axial chief ray, it causes trapezoid distortion to be generated; however, the curved reflecting surface of irrotationally symmetric shape would allow for correction of trapezoid distortion, giving images that are less distorted yet with a wide field of view.

In the invention, said at least two imaging optical systems each have a plurality of reflecting surfaces. Thus, if each imaging optical system has a plurality of reflecting surfaces, it works for size reductions because light is reflected plural times on the optical path taken.

In the invention, said at least two imaging optical systems each have a plurality of curved reflecting surfaces.

Thus, if each imaging optical system has curved reflecting surfaces, correction of aberrations from decentration is then easily implemented, working for size reductions of the imaging optical system.

In the invention, said plurality of curved reflecting surfaces in said two imaging optical systems are each in an irrotational symmetric, aspheric shape.

Such arrangement makes sure the degree of flexibility in design, and makes easier correction capable of canceling out aberrations from decenteration, working for size reductions.

In the invention, it is preferable that said at least two imaging optical systems each have a prism having said plurality of reflecting surfaces.

Such arrangement makes it easier to hold back relative misalignments of the plurality of reflecting surfaces, reducing the occurrence of aberrations due to fabrication errors.

In the invention, said prisms in said at least two imaging optical systems each comprise, in order from an object side along an axial chief ray toward an image plane, a first surface having transmitting action, a second surface having internal reflecting plus transmitting action, and a third reflecting surface having reflecting action;

said prisms are each formed of a medium having a refractive index of 1.45 or greater; and said axial chief ray enters the medium through said first surface, is reflected off said second surface, then off said third surface, and then leaves the medium through said second surface.

It is here noted that the axial chief ray here is defined as a ray passing through both the center of gravity of the image plane by each imaging optical system and the center of gravity of each aperture stop.

Such arrangement allows the second or reflecting surface to have both functions of reflection and transmission so that the prism makes sure the optical path taken inside and prism size can grow small, working for size reductions of each imaging optical system.

Preferably in the invention, said at least two imaging optical systems each comprise an aperture stop located on an object side of said first surface of said prism.

Such arrangement permits the aperture stop to take a role in the determination of the axial chief ray, making it possible to offer a sensible tradeoff between making sure the angle of view and telecentric capability on the image side and size reductions of the prism.

It is noted that the aperture stop may be replaced by a black coating material coated on the first surface, a stop member spaced away from the first surface (which may be integral with the prism holder frame), etc.

Preferably in the invention, the reflecting surfaces in said at least two imaging optical systems are tilted with respect to the axial chief ray such that a plane including the axial chief ray is vertical to the direction of juxtaposition of said at least three imaging optical systems.

With such arrangement, for instance, when at least two imaging optical systems are used to take images of objects in the right-and-left direction horizontal to a road surface, the respective reflecting surfaces are positioned such that the normal to each reflecting surface at the position of incidence of the axial chief ray lies in the horizontal plane so as to place the planes including the axial chief ray of the imaging optical systems stacked up parallel in the horizontal direction. This makes it possible to obtain images having a wide angle of view in the right-and-left direction.

Preferably in the invention, said at least two imaging optical systems are of the same shape, and one imaging optical system is flipped with respect to another with an axis vertical to the imaging plane of the imaging device as an axis of symmetry.

Such arrangement works favorably for slashing fabrication costs, because the parts of a plurality of imaging optical systems can be fabricated by the same fabrication process.

In the invention, of said at least three imaging optical systems, at least one may be adapted to reflect an axial chief ray from an object in a direction between imaging directions of said at least two imaging optical systems, and may comprise a curved reflecting surface of concave shape.

With such arrangement, when at least two imaging optical systems are used to take images of objects in the right-and-left direction, the aforesaid at least one imaging optical system works taking images of objects ahead, ahead and down, and ahead and up, etc. This allows at least three imaging optical systems to share imaging directions, making it possible to set up an imaging apparatus with no or little blind spot in the imaging range.

In this case, the aforesaid at least one imaging optical system may be designed to take images of objects in the direction vertical to the aforesaid imaging plane.

Such arrangement enables images of objects in the right-and-left direction to be taken by at least two imaging optical systems, and images of objects in the vertical direction to the imaging plane to be taken as well.

In the invention, said at least one imaging optical system may comprise a prism that is located just in front of the imaging plane and has said curved reflecting surface, and a reflecting surface that is located in the same orientation as any one of said at least two imaging optical systems is located and reflects light rays.

With such arrangement, the decentered prisms and reflecting surfaces may be used to set up an layout that allows the optical systems for taking images of objects ahead to be slimmed down.

In the invention, said at least one imaging optical system may comprise a prism that is located just in front of the imaging plane and has said curved reflecting surface;

said prism in said at least one imaging optical system is located in the same orientation as any one of said at least two imaging optical systems is located, and a reflecting member that is located in the same orientation as any one of said at least two optical systems is located and reflects light rays, wherein said reflecting member comprises a fourth surface having transmitting and internal reflecting action, a fifth surface having reflecting action, and a sixth surface having transmitting action, and takes an optical path on which the axial chief ray enters the medium through said fourth surface, is reflected off said fifth surface, then off said fourth surface, and then leaves the medium through said sixth surface.

Thus, allowing the fourth surface of the reflecting surface located on the object side to have both functions of reflection and transmission works for making sure an optical path having a wide angle of view and size reductions of the optical systems as well.

In the invention, said decentered prism in said at least one imaging optical system may comprise, in order from an object side along an axial chief ray toward an image plane, three optical surfaces: a first surface having transmitting action, a second surface having internal reflecting plus transmitting action, and a third reflecting surface having reflecting action, and may be formed of a medium having a refractive index of 1.45 or greater, wherein said axial chief ray takes an optical path on which it enters the medium through said first surface, is reflected off said second surface, then off said third surface, and then leaves the medium through said second surface.

Thus, allowing the second or reflecting surface of the decentered prism to have both functions of reflection and transmission works for size reductions of the imaging optical systems, because of making sure the prism has an optical path inside and permitting prism size to be diminished.

In the invention, the de centered prism in said at least one imaging optical system may be formed of a medium that includes, in order from an object side along an axial chief ray toward the image plane, three optical surfaces: a first surface having transmitting action, a second surface having internal reflecting action and transmitting action and a third surface having reflecting action, and has a refractive index of 1.45 or greater, wherein said axial chief ray takes an optical path on which it enters the medium through said first surface, is reflected off said second surface, then off said third surface, and leaves the medium through said second surface.

Thus, allowing the second or reflecting surface of the de centered prism to have both functions of reflection and transmission works for size reductions of the imaging optical system because of making sure the prism has an optical path inside and prism size is diminished.

Preferably in the invention, there is an additional imaging optical system located in a different orientation between said at least one imaging optical system and an imaging optical system located in the same orientation as it is located.

Such arrangement helps reduce interferences of the optical paths through the imaging optical systems located in the same orientation, facilitating making sure the angle of view in the direction of juxtaposition of the imaging optical systems.

In the invention, an imaging field of view set by said at least two imaging optical systems may be linked to an imaging field of view of said at least one imaging optical system.

Such arrangement leads to a small-format imaging apparatus wherein there is no or little blind spot in the left, front and right directions.

In the invention, said at least one imaging optical system is adapted to form an image of an object in a direction that is tilted in the direction of juxtaposition of said at least three imaging optical systems with respect to a direction vertical to said imaging plane.

Such arrangement enables images of objects in the right-and-left direction to be taken by at least two imaging optical systems, and images of objects ahead and up and/or ahead and down with respect to the imaging plane.

In the invention, said at least one imaging optical system may include the same optical systems as said at least two imaging optical systems, and be located in a different orientation from those of said at least two imaging optical systems.

Such arrangement enables parts of the imaging optical systems to be fabricated by the same fabrication process, contributing more to fabrication cost reductions of molds or the like.

Desirously in the invention, said at least three imaging optical systems are provided with a light block member inserted between them that blocks off light rays from the adjacent imaging optical system or systems.

Such arrangement can reduce interferences of images due to the respective imaging optical systems, flares, etc.

Further, the invention embraces a vehicle comprising a body, and any one of the aforesaid imaging apparatus, which is attached to a front portion of said body.

For instance, when a motor vehicle pulls out of a parking position into a road, such arrangement helps check out what goes on in the surround.

Furthermore, the invention embraces a vehicle, comprising a body, and any one of the aforesaid imaging apparatus, which is attached to the rear portion of said body.

For instance, when a motor vehicle is put in reverse and backed it into a parking position, such arrangement helps check up what goes on in the surround. It may also be used as an imaging apparatus for drive recorders.

Furthermore, the invention embraces a vehicle comprising a body and any one of the aforesaid imaging apparatus which is attached to either side of said body.

Such arrangement makes it easy to check up blind spots in the right-and-left direction of a motor vehicle.

As described above, the present invention provides an imaging apparatus capable of taking images of objects in at least three directions on a single imaging device, has a wide imaging angle of view and is of small-format size, and a vehicle incorporating the same.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1, 2 and 3 of the inventive imaging apparatus capable of taking images of objects in a plurality of directions are now explained. Note here that constitutional parameters in each example will be given later.

First of all, reference is made to the coordinate systems, decentered surfaces, and free-form surfaces used in the following examples.

Figure 1:
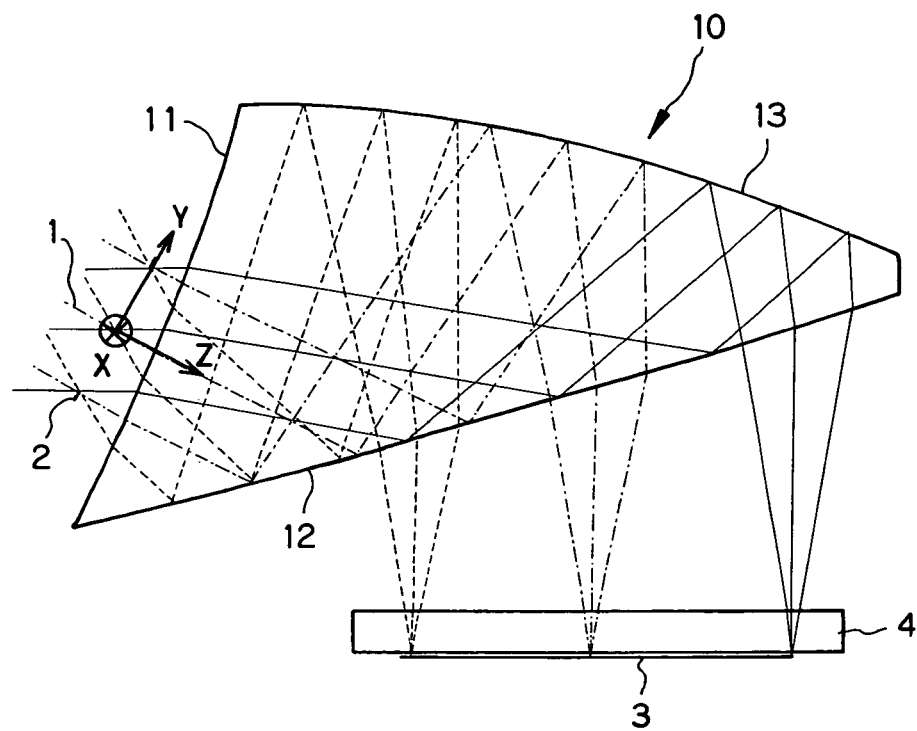
FIG. 1 is illustrative in the section including an axial chief ray of one optical system in the imaging apparatus of Example 1 according to the invention.

In each example, an axial chief ray 1 is defined by a light ray that leaves the center of an object (subject), passes through the center of an aperture stop 2, and arrives at the center of an image plane 3, as shown in FIG. 1 (when there is none of horizontal and vertical symmetry in the aperture stop 2 and image plane 3, it is defined as a light ray that passes through both the centers of gravity of the image plane 3 and aperture stop 2). And the origin is defined by the center of the aperture stop 2 (Example 1) or the point of intersection of the optical surface located nearest to the object side with the axial chief ray 1 (Example 2); the direction of travel of the axial chief ray 1 is taken as the Z axis positive direction; a plane including that Z axis and the center of the image plane is taken as the Y-Z plane, the direction that is orthogonal to the Y-Z plane through the origin and passes through the paper downward is taken as the X axis positive direction, and an axis that forms a right-handed orthogonal coordinate system with the X and Y axes is taken as the Y axis.

In Examples 1, 2 and 3, each surface is decentered within that Y-Z plane, and only one symmetric surface for each rotationally asymmetric surface is given by the Y-Z plane.

Given for a decentered surface are the amount of decentration of the apex of that surface from the center of the origin of the thus determined coordinate system (x, y and z in the X, Y and Z axis directions) and the angles ($\alpha$, $\beta$, $\gamma$ (°)) of tilt of the center axis (the Z axis in the following formula (a) for a free-form surface and the Z axis in the following formula (b) for an aspheric surface) with respect to the X axis, the Y axis, and the Z axis, respectively. It is here noted that the positive $\alpha$ and $\beta$ mean counterclockwise rotation with respect to the positive directions of the respective axes, and the positive $\gamma$ means clockwise rotation with respect to the positive direction of the Z axis. Regarding to how to rotate the center axis $\alpha$, $\beta$ and $\gamma$ of the surface, first of all, the center axis of the surface and its XYZ orthogonal coordinate system are $\alpha$ rotated counterclockwise about the X axis. Then, the center axis of the thus rotated surface is $\beta$ rotated counterclockwise about the Y axis of a new coordinate system, and the once rotated coordinate system is $\beta$ rotated counterclockwise about the Y axis, too. Then, the center axis of the twice rotated surface is $\gamma$ rotated clockwise about the Z axis of another new coordinate system.

Regarding the optical action surfaces forming the optical system of each example, when a specific surface and the subsequent surface form a coaxial optical system, there is a spacing given. Besides, the refractive indices and Abbe's constants of the media are given as usual.

The free-form surface used herein is defined by the following formula (a). Note here that the axis of the free-form surface is given by the Z axis for that defining formula.

$$Z = (r^2/R)/\left[1 + \sqrt{\{1-(1+k)(r/R)^2\}}\right] + \sum_{j=1}^{66} C_j X^m Y^n \quad (a)$$

Here the first term of formula (a) is the spherical one and the second term is the free-form surface one.

In the spherical term,
R is the radius of curvature of the apex,
k is the conic constant, and
$r = \sqrt{(X^2+Y^2)}$ The free-form surface term is $$\sum_{j=1}^{66} C_j X^m Y^n = C_1 + C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7 \ldots$$

Here $C_j$ (j is an integer of 1 or greater) is a coefficient.

In general, the aforesaid free-form surface has no symmetric surface at both the X-Z plane and the Y-Z plane. However, by reducing all the odd-numbered terms for X down to zero, that free-form surface can have only one symmetric surface parallel with the Y-Z plane. For instance, this may be achieved by reducing down to zero the coefficients for the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, . . . .

By reducing all the odd-numbered terms for Y down to zero, the free-form surface can have only one symmetric surface parallel with the X-Z plane. For instance, this may be achieved by reducing to zero the coefficients for the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, . . . .

In any one of the directions of the aforesaid symmetric surface, there is a symmetric surface provided and in association with this, for instance, the direction of decentration of the optical system with respect to the symmetric surface parallel with the Y-Z plane is set in the Y axis direction while the direction of decentration of the optical system with respect to the symmetric surface parallel with the X-Z plane is set in the X axis direction. This in turn makes it possible to improve productivity while, at the same time, rotationally asymmetric aberrations from decentration are effectively corrected.

The aforesaid defining formula (a) is given only by way of example as described above. However, it goes without saying that the invention here is characterized in that by use of the free-form surface that is symmetric with respect to plane and has only one plane of symmetry, rotationally asymmetric aberrations from decentration are corrected while, at the same time, productivity is improved, and there are similar advantages obtained for any other defining formulae, too.

It is here noted that the term with respect to free-form surfaces about which no data are given is zero. For the refractive index, d-line (of 587.56 nm wavelength) refractive indices are given. Length is given in mm.

FIG. 1 is illustrative in the Y-Z section including an axial chief ray 1 of one optical system of the imaging apparatus of Example 1 (an imaging optical system for taking images of objects on the left). This optical system is made up of a decentered prism optical system 10 located on an image side with respect to an aperture stop 2 and an image plane 3, and there is a cover glass 4 located in front of the image plane 3. Just in front of the cover glass, there may be filters such as low-pass filters and infrared cut filters disposed. The decentered prism optical system 10 is formed of a medium that includes a first transmitting surface 11 that is an entrance surface, a second reflecting plus transmitting surface 12 and a third reflecting surface 13, and has a refractive index of 1.45 or greater. Light rays coming from an object through the aperture stop 2 enter the medium through the first surface 11, and are totally reflected off the second surface 12 and then reflected off the third surface 13. Through the second surface 12 this time, the light rays leave the decentered prism optical system 10, and they are imaged at the image plane 3 through the cover glass 4.

And, the first 11, the second 12 and the third surface 13 of the decentered prism optical system 10 are each constructed of a free-form surface having the Y-Z plane as only one surface of symmetry that has power and is configured in such rotationally asymmetric shape as to correct aberrations from decentration. Allowing the reflecting surface in particular to have such surface shape is effective for the correction of aberrations from decentration.

Thus, by the use for the optical system of the imaging apparatus of the decentered prism optical system 10 wherein at least one of the three surfaces is constructed of a rotationally asymmetric surface, it is possible to set up an imaging optical system that has a simplified construction having a reduced parts count and can take less deformed images with higher resolution on their peripheries even at wide angles of view.

Figure 2:
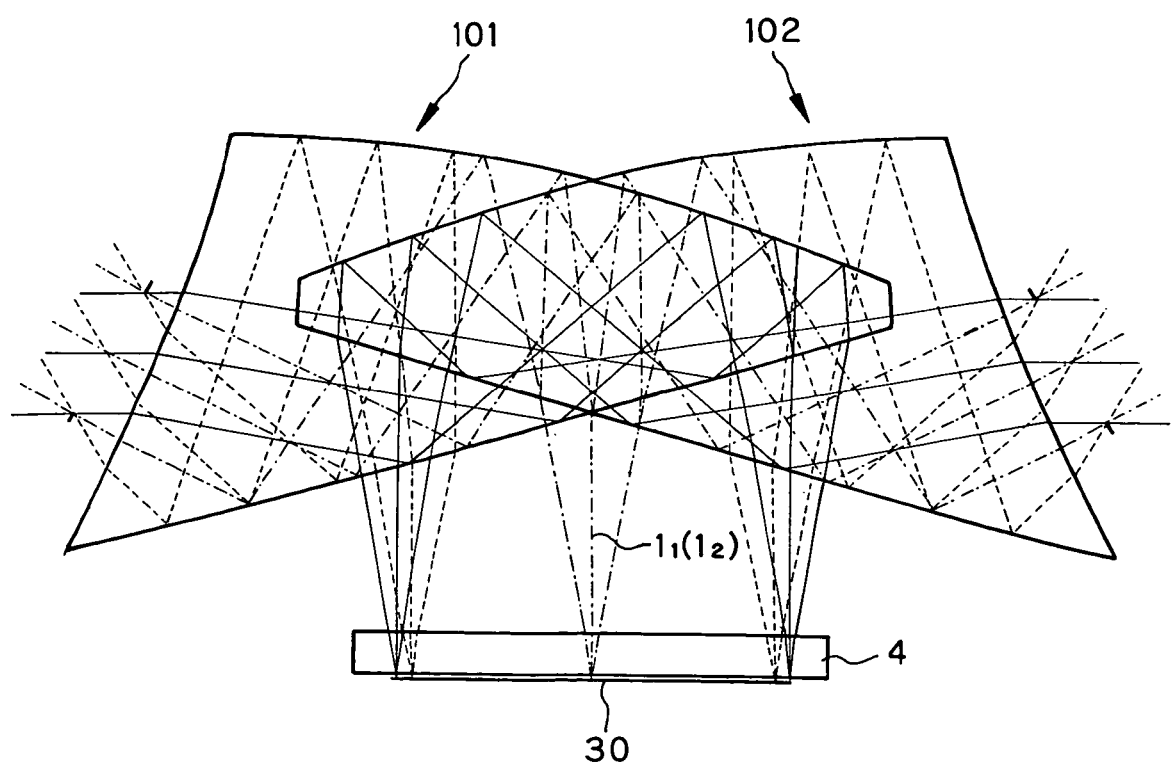
FIG. 2 is illustrative in perspective of three such optical systems as shown in FIG. 1, which are used in the imaging apparatus of Example 1, as viewed from above.
Figure 3:
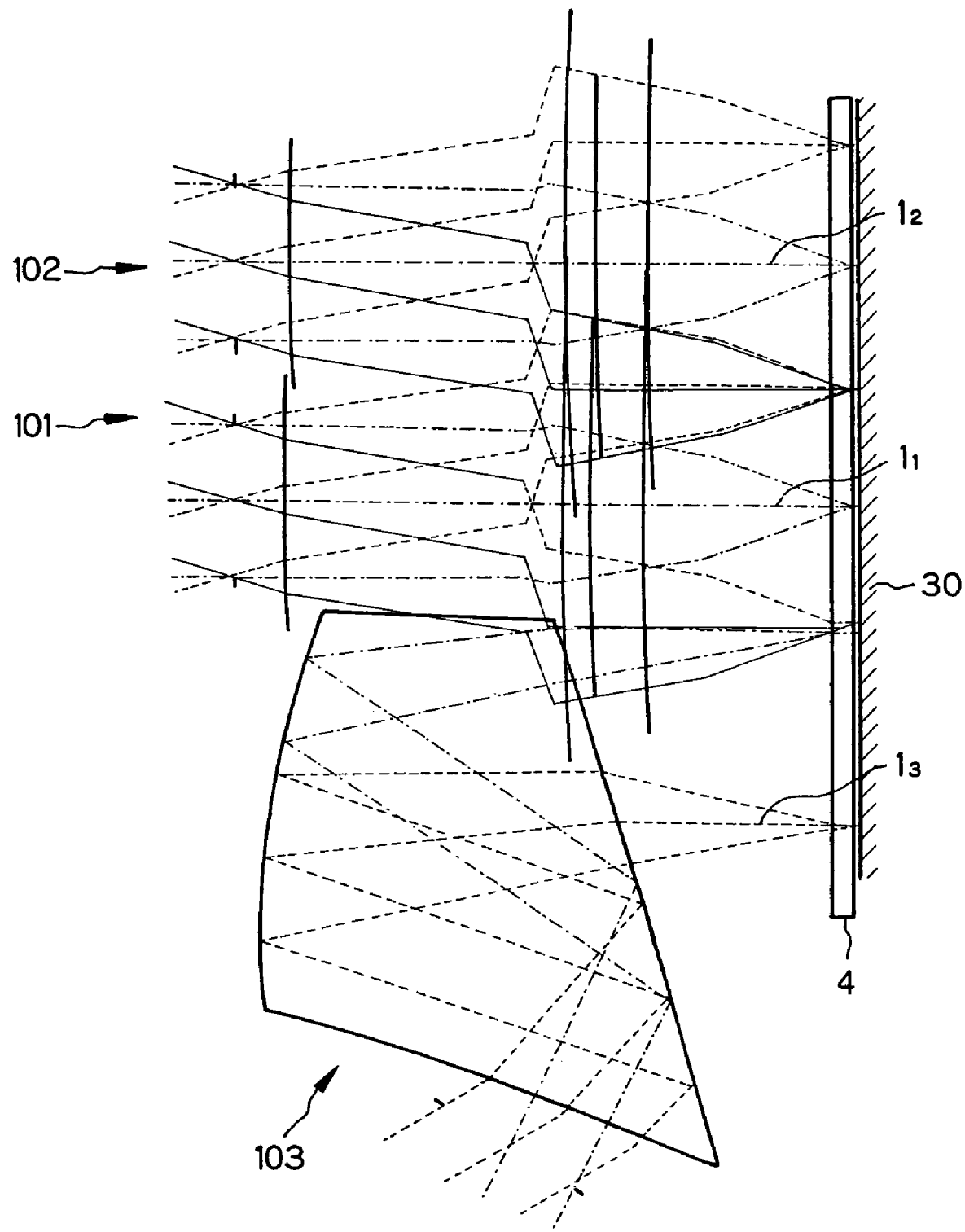
FIG. 3 is a side view of the optical systems in the imaging apparatus of Example 1 according to the invention.
Figure 4:
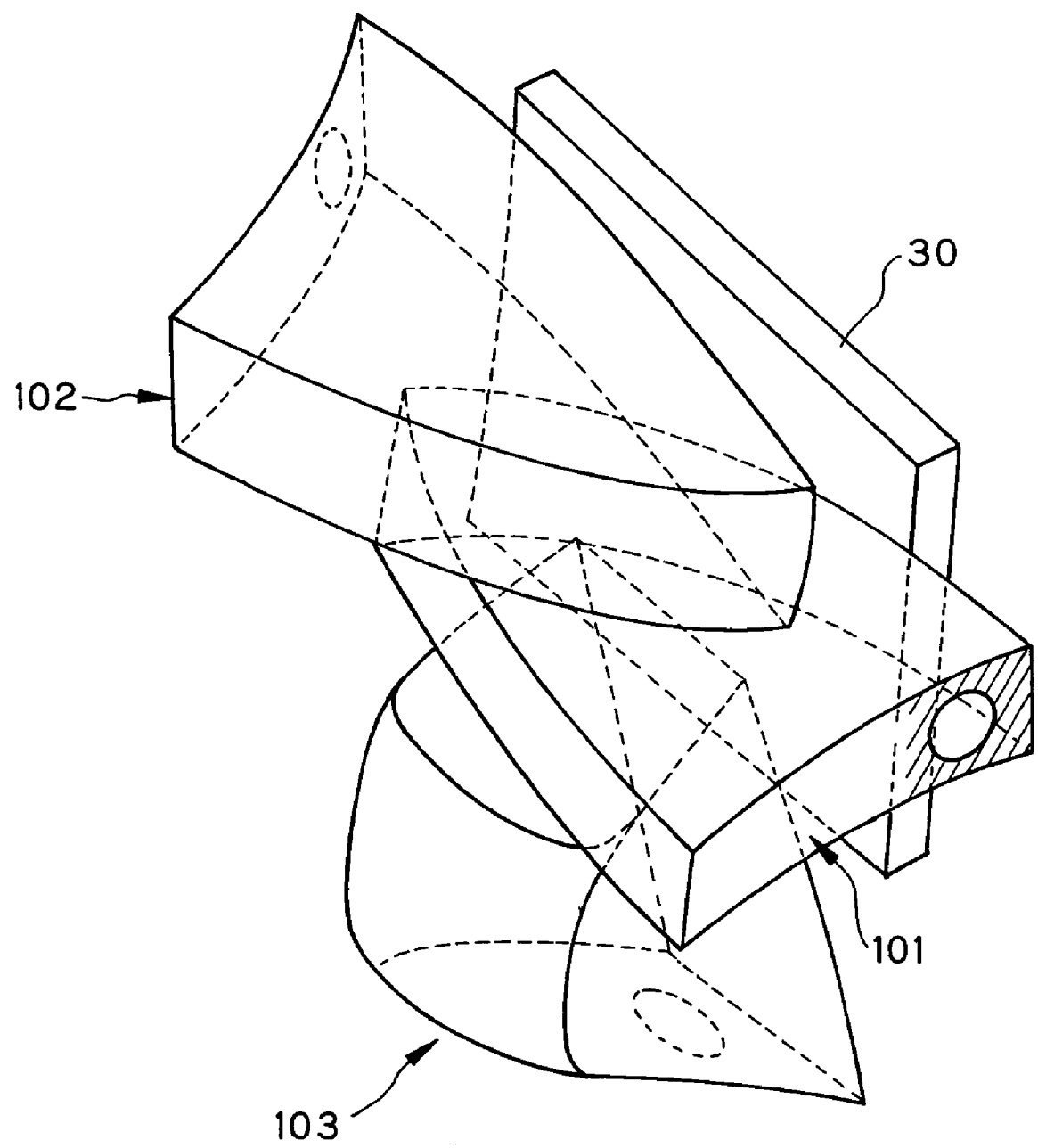
FIG. 4 is a perspective view of the imaging apparatus of Example 1 according to the invention.

FIG. 2 is illustrative in perspective of the imaging apparatus here that uses three such optical systems as shown in FIG. 1, as viewed from above; FIG. 3 is a side view of that imaging apparatus (where prisms 101 and 102 are drawn in a simplified fashion), and FIG. 4 is illustrative in perspective of that imaging apparatus, as viewed from obliquely above. That imaging apparatus uses such optical systems as shown in FIG. 1 or, specifically, prisms 101, 102 and 103 of the same shape; however, the prism 103 is partly cut away, as described later. Both the optical systems 101 and 102 are located in juxtaposition such that as one optical system 101 is rotated with respect to another 102 at an angle of 180° about an axial chief ray $1_1$ (vertical to the image plane 3) going toward the image plane 3, it causes the Y-Z planes of the optical systems 101 and 102 to be parallel with each other and the planes of both the optical systems 101 and 102 including axial chief rays $1_1$ and $1_2$ going toward the image plane 3 to be vertical to the Y-Z planes. Thus, images formed on the image plane 3 by the respective optical systems 101 and 102 are going to be formed in juxtaposition on the single imaging device 30.

And, the respective optical systems 102, 101 and 103 are located parallel from top to bottom such that the Y-Z plane of the optical system 103 is orthogonal to the Y-Z planes of both the optical systems 101 and 102, and the axial chief rays $1_2$, $1_1$ and $1_3$ going toward the image plane 3 for the optical systems 102, 101 and 103 lie on the same plane, so that images formed on the image plane 3 by the respective optical systems 102, 101 and 103 are going to be formed in juxtaposition on the single imaging device 30.

It is noted that the imaging optical system 103 is located such that its imaging area is half that of the imaging optical system 101, 102, and light rays corresponding to the axial chief rays for the optical systems 101 and 102 lie at the upper end of the associated imaging plane, i.e., at a position of a boundary portion of it and the imaging plane associated with the optical system 101.

For this reason, the prism 10 (FIG. 1) for the imaging optical system 103 is in such a shape as to partly cut away a part of the prism 10 for the imaging optical system 101, 102.

The imaging apparatus of such construction may be used as, for instance, an onboard camera designed to simultaneously take and view left images, right images and images ahead and down on the same imaging device 30 with one optical system 101, another optical system 102 and yet another optical system 103, respectively.

For instance, when the imaging plane of the imaging device 30 has a length-to-width ratio of about 3:2, there are three screens arranged from top to bottom, each having a length-to-width ratio of 1:2 on the right and left and a length-to-width ratio of 1:1 ahead and down, whereby images of objects in three directions can be taken at wide angles of view in the horizontal and vertical directions.

For instance, when the imaging plane has a length-to-width ratio of 3:4, there are three screens arranged from top to bottom, each having a length-to-width of 1:4 on the right and left and a length-to-width ratio of 1:2 ahead and down, whereby images of objects in three directions can be taken at wide angles of view in the horizontal and vertical directions.

In the invention, the decentered prism optical systems of the same shape are used as the decentered prism optical systems 10 for the three optical systems 101, 102 and 103, and they are mutually rotated with respect to the imaging plane of the same imaging device 30 at the angles of 180° (for the optical system 101, 102) and 90° (for the optical system 103). This enables parts to be fabricated by the same fabrication process so that the fabrication cost of molds or the like can beneficially be slashed. To hold each decentered prism optical system 10 in place, it is preferable to provide the optical system 101, 102 with lugs or the like for holding each prism in the major axis direction, because of the need of locating the optical systems 101, 102 and 103 adjacent to one another. Further, when the optical system 101, 102 is provided with a lug or other support in the minor axis direction, it is preferable to provide that support on one side and locate the lug-free sides adjacent to each other.

And there is a light block member provided between the decentered prism optical systems 10 for blocking off inessential light such as flare light. To this end, the sides of the decentered prism optical system 10 may be coated with a light block coating material or, alternatively, a light block sheet for blocking off light may be sandwiched between the sides of the decentered prism optical systems 10 to locate the three decentered prism optical systems 10 adjacent to one another.

It is here noted that there may be a partial common part provided; for instance, there may be a common lens or other optical element provided just in front of the imaging planes of the three optical systems 101, 102 and 103.

Referring here to the aperture stop 2, a stop member (that may be integral with a prism holder frame) may be located away from the first surface 11 or, alternatively, a light block coating material may be applied on the first surface 11.

Figure 5:
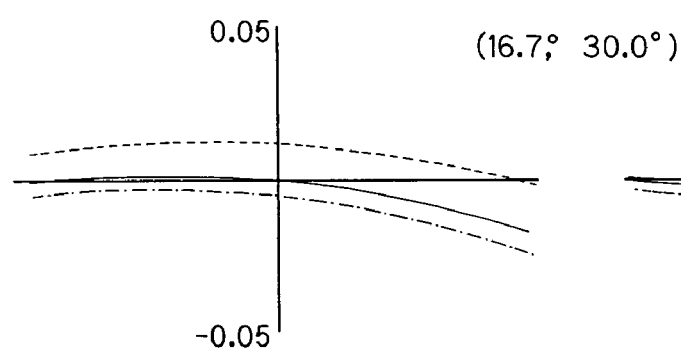
FIG. 5 is an aberration diagram for the optical systems according to Example 1.
Figure 5:
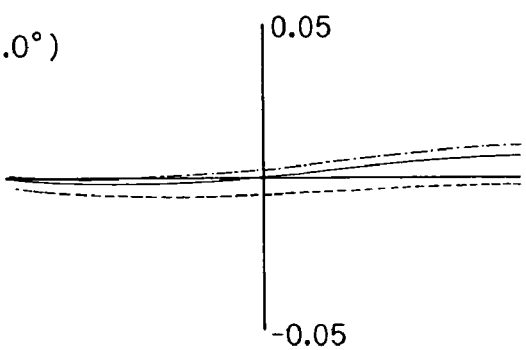
Figure 5:
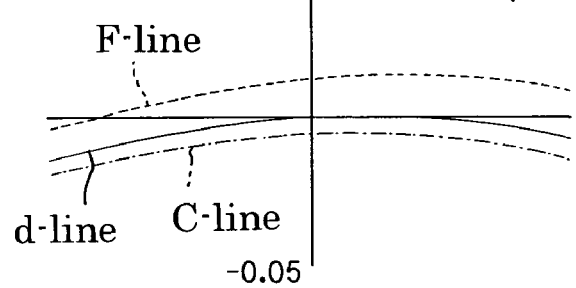
Figure 5:
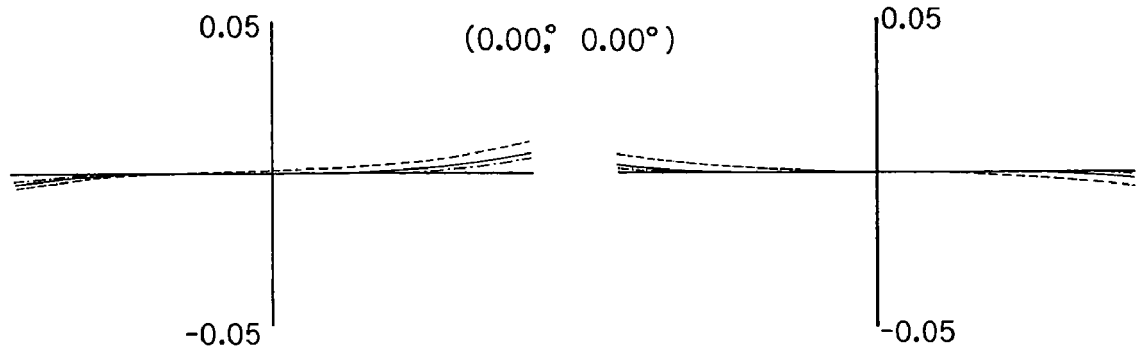
Figure 6:
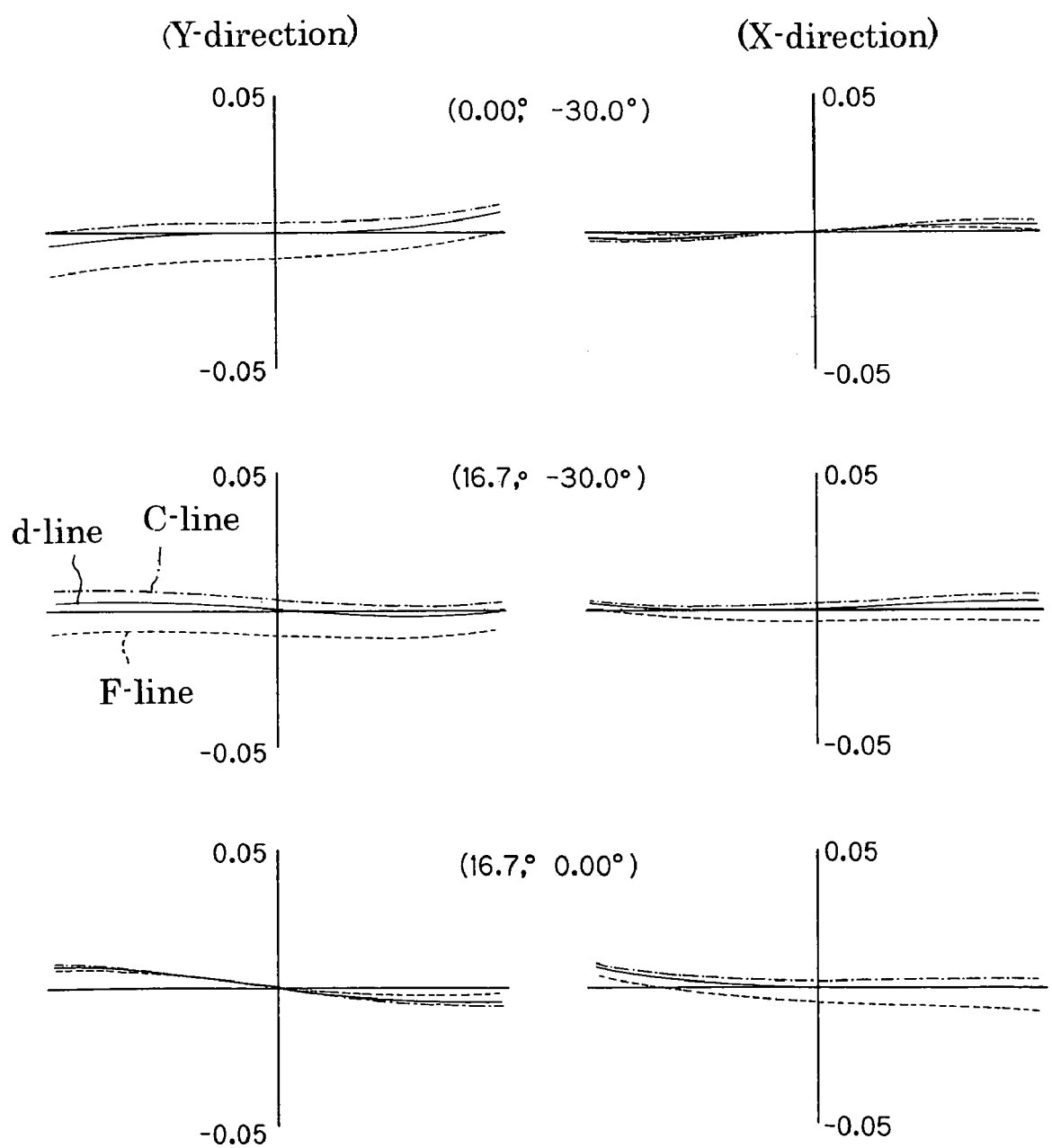
FIG. 6 is an aberration diagram for the optical systems according to Example 1.

Transverse aberrations of the optical systems 101, 102 and 103 in Example 1 are shown in FIGS. 5 and 6, wherein bracketed figures represent angles of view in the X and Y directions, standing for transverse aberrations at those angles of view. The same will go for the following examples.

The specifications of the optical systems in Example 1 are:
Angle of view: 33.4°×60.0°,
Entrance pupil diameter: φ1.0 mm,
Focal length: 2.63 mm in the Y-Z plane,
2.71 mm in the X-Z plane, and
F-number: 2.63 in the Y-Z plane,
2.71 in the X-Z plane.

It is noted that half the area of the image optical system 103 designed to take images of objects ahead and down is available, as described above.

Figure 7:
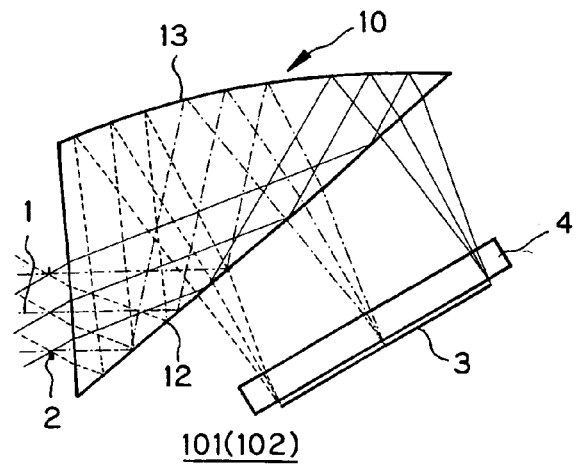
FIG. 7 is illustrative in the section including an axial chief ray of the optical system for taking images of objects in one of the right and left directions in the imaging apparatus of Example 2 according to the invention.

FIG. 7 is illustrative in the Y-Z section including an axial chief ray for optical systems 101 and 102 in the imaging apparatus of Example 1 adapted to take images of objects on one of the right and the left side. Each optical system has an aperture stop 2 located nearest to the object side, and includes a decentered prism optical system 10 located on an image side with respect to the stop 2 and an image plane 3. In front of the image plane 3 there is a cover glass 4 located, where a low-pass filter and an infrared cut filter may be disposed. The decentered prism optical system 10 is formed of a medium that includes a first transmitting surface 11 that is an entrance surface, a second reflecting plus transmitting surface 12 and a third reflecting surface 13, and has a refractive index of 1.45 or greater. Light rays coming from an object through the aperture stop 2 enter the medium through the first surface 11, and are totally reflected off the second surface 12 and then reflected off the third surface 13. Through the second surface 12 this time, the light rays leave the decentered prism optical system 10, and they are imaged at the image plane 3 through the cover glass 4.

Figure 8:
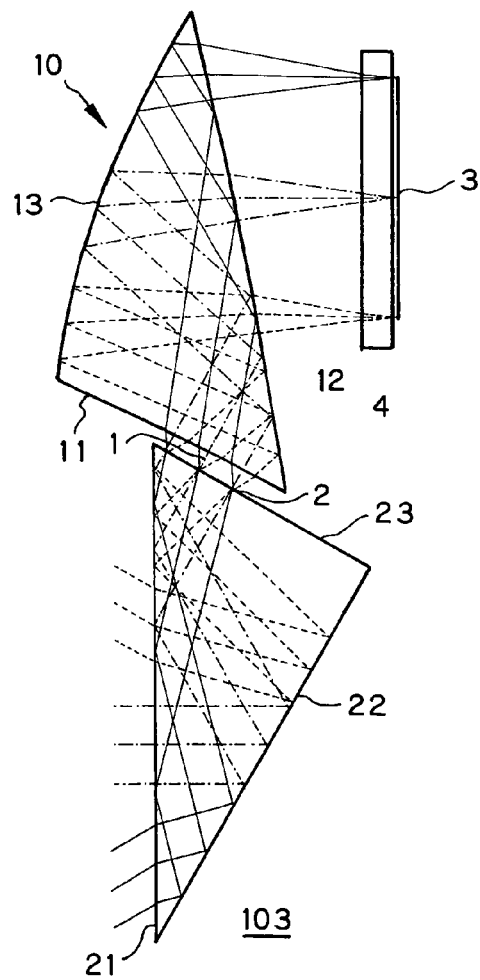
FIG. 8 is illustrative in the section including an axial chief ray of the optical system for taking images of objects ahead in the imaging apparatus of Example 2 according to the invention.

FIG. 8 is illustrative in the Y-Z section including an axial chief ray 1 for an optical system 103 in the imaging apparatus of Example 2 for taking images of objects ahead. This optical system comprises a decentered prism optical system 10 that is similar to the decentered prism 10 for the optical system 101, 102, and the cover glass 4 on an image side with respect to the aperture stop 2, and takes a similar optical path. The optical system further comprises a prism 20 that is a reflecting member located on an object side with respect to the aperture stop 2 and including two planar reflecting surfaces. Working as the reflecting member, the prism 20 includes a fourth surface 21 having transmitting plus internal reflecting action, a fifth surface 22 having reflecting action and a sixth surface 23 having transmitting action. Through the fourth surface 21, the axial chief ray 1 enters the medium, and takes an optical path on which the axial chief ray 1 is reflected off the fifth surface 22, and then reflected off the fourth surface 21, leaving the medium through the sixth surface 23. The reflecting and transmitting surfaces of the prism 20 are all in planar shape. And the surface including the axial chief ray 1 is in alignment with the surface of the next decentered prism optical system 10 including the axial chief ray 1.

And, the first 11, the second 12 and the third surface 13 of each decentered prism optical system 10 is each constructed of a free-form surface having the Y-Z plane as only one surface of symmetry that has power and is configured in such rotationally asymmetric shape as to correct aberrations from decentration. Allowing the reflecting surface in particular to have such surface shape is effective for the correction of aberrations from decentration.

Thus, by the use for the optical system 101, 102, 103 of the imaging apparatus here of the decentered prism optical system 10 wherein at least one of the three surfaces is constructed of a rotationally asymmetric surface, it is possible to set up an imaging optical system that has a simplified construction having a reduced parts count and can take less deformed images with higher resolution on their peripheries even at wide angles of view.

Figure 9:
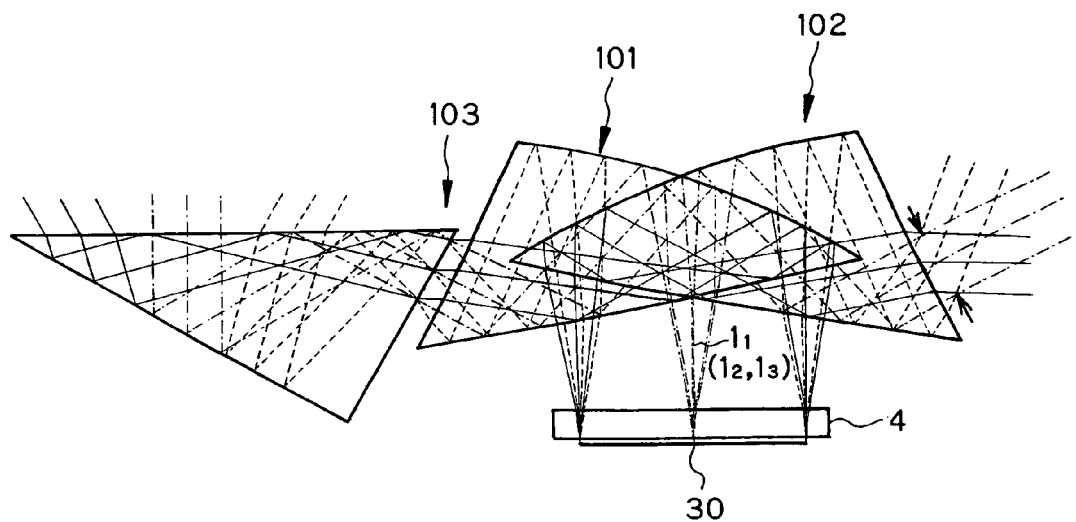
FIG. 9 is a perspective view of the optical systems of FIG. 7 and the optical systems of FIG. 8, as viewed from above, which are used in the imaging apparatus of Example 2.
Figure 10:
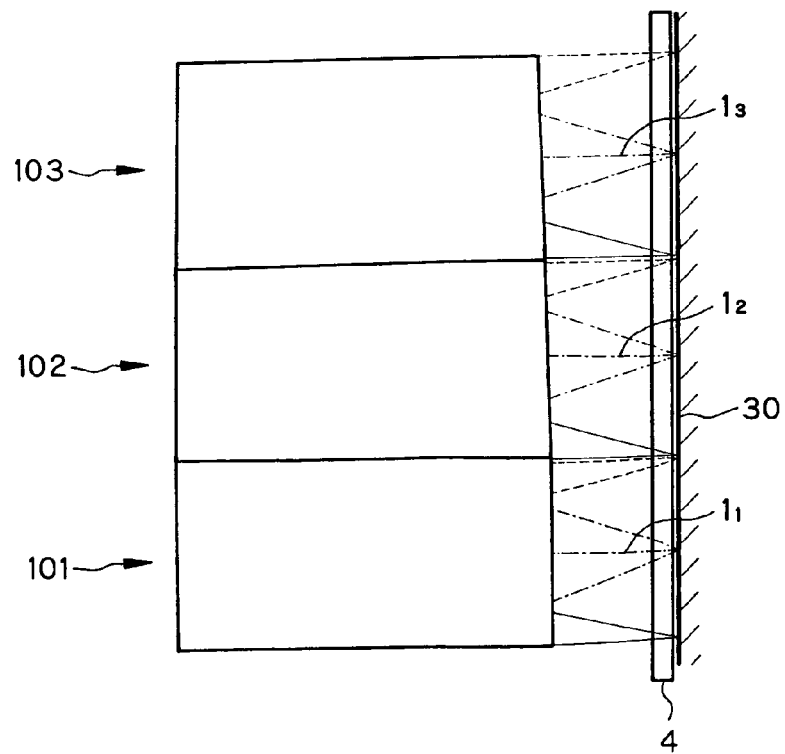
FIG. 10 is a side view of the optical systems in the imaging apparatus of Example 2 according to the invention.
Figure 11:
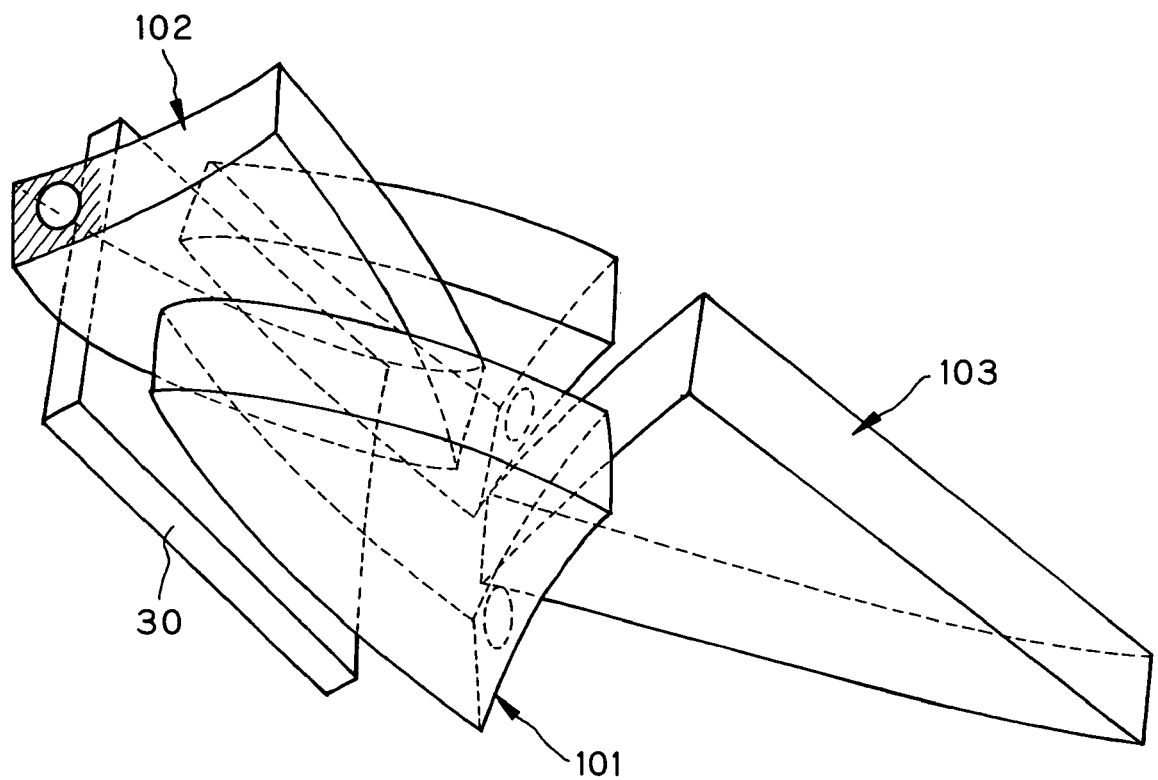
FIG. 11 is a perspective view of the imaging apparatus of Example 2 according to the invention.

FIG. 9 is illustrative, in perspective as viewed from above, of the imaging apparatus here comprising two such optical systems as shown in FIG. 7, and one such optical system as shown in FIG. 8, FIG. 10 is a side view of that imaging apparatus (however, the prisms 101, 102 and 103 are simply drawn), and FIG. 11 is a perspective view of that imaging apparatus as viewed from obliquely below.

This imaging apparatus uses two such similar optical systems as shown in FIG. 7. Both the optical systems 101 and 102 are located in juxtaposition such that as one optical system 102 is rotated with respect to another 101 at an angle of 180° about an axial chief ray $1_2$ (vertical to the image plane 3) toward the image plane 3, it causes the respective Y-Z planes to be parallel with each other and their planes including axial chief rays $1_1$ and $1_2$ toward the image plane 3 to be vertical to the Y-Z planes, whereby images formed on the image plane 3 by the respective optical systems 101 and 102 are going to be juxtaposed and formed on the single imaging device 30.

And, the respective optical systems 103, 102 and 101 are juxtaposed parallel from top to bottom such that the Y-Z plane of such optical system 103 as shown in FIG. 8 is parallel with the Y-Z planes of both the optical systems 101 and 102 and the planes of the optical systems 101, 102 and 103 including the associated axial chief rays $1_1$, $1_2$ and $1_3$ toward the image plane 3 lie on the same plane, whereby images formed by the respective optical systems 103, 102 and 101 are going to be juxtaposed and formed on the single imaging device 30.

It is here noted that the decentered prisms 10 for the imaging optical systems 103 and 101 are located in the same orientation. The imaging area involved is such that the imaging optical systems 101, 102 and 103 each have a horizontal angle of view of 60° or greater with the respective imaging fields adjacent to one another.

The imaging apparatus of such construction may be used as, for instance, an onboard camera designed to simultaneously take and view left images, right images and images ahead on the same imaging device 30 with one optical system 101, another optical system 102 and yet another optical system 103, respectively.

For instance, when the imaging plane of the imaging device 30 has a length-to-width ratio of about 3:4, there are screens arranged from top to bottom, each having a length-to-width ratio of 1:4 on the right and left and ahead, thereby making the horizontal angle of view wide. When there must be some angle of view in the vertical direction, too, the imaging device 30 is allowed to have a length-to-width ratio of 4:3 with screens, each having a length-to-width ratio of 1.33:3, being arranged from top to bottom.

In the invention, three such optical systems 101, 102 and 103 are mutually rotated 180° into a juxtaposed configuration so that mutual interferences of the respective visual angles can be reduced. To hold each decentered prism optical system 10 in place, it is preferable to provide the optical system 101, 102 with lugs or the like for holding the prisms in the major axis direction, because of the need of locating the optical systems 101, 102 and 103 adjacent to one another. Further, when the optical systems are provided with lugs or other supports in the minor axis direction, it is preferable to provide them on one side and locate the lug-free sides adjacent to each other.

And there is a light block member provided between the decentered prism optical systems 10 for blocking off inessential light such as flare light. To this end, the sides of the decentered prism optical system 10 may be coated with a light block coating material or, alternatively, a light block sheet for blocking off light may be inserted between the sides of the decentered prism optical systems 10 to locate the three decentered prism optical systems 10 adjacent to one another.

Figure 12:
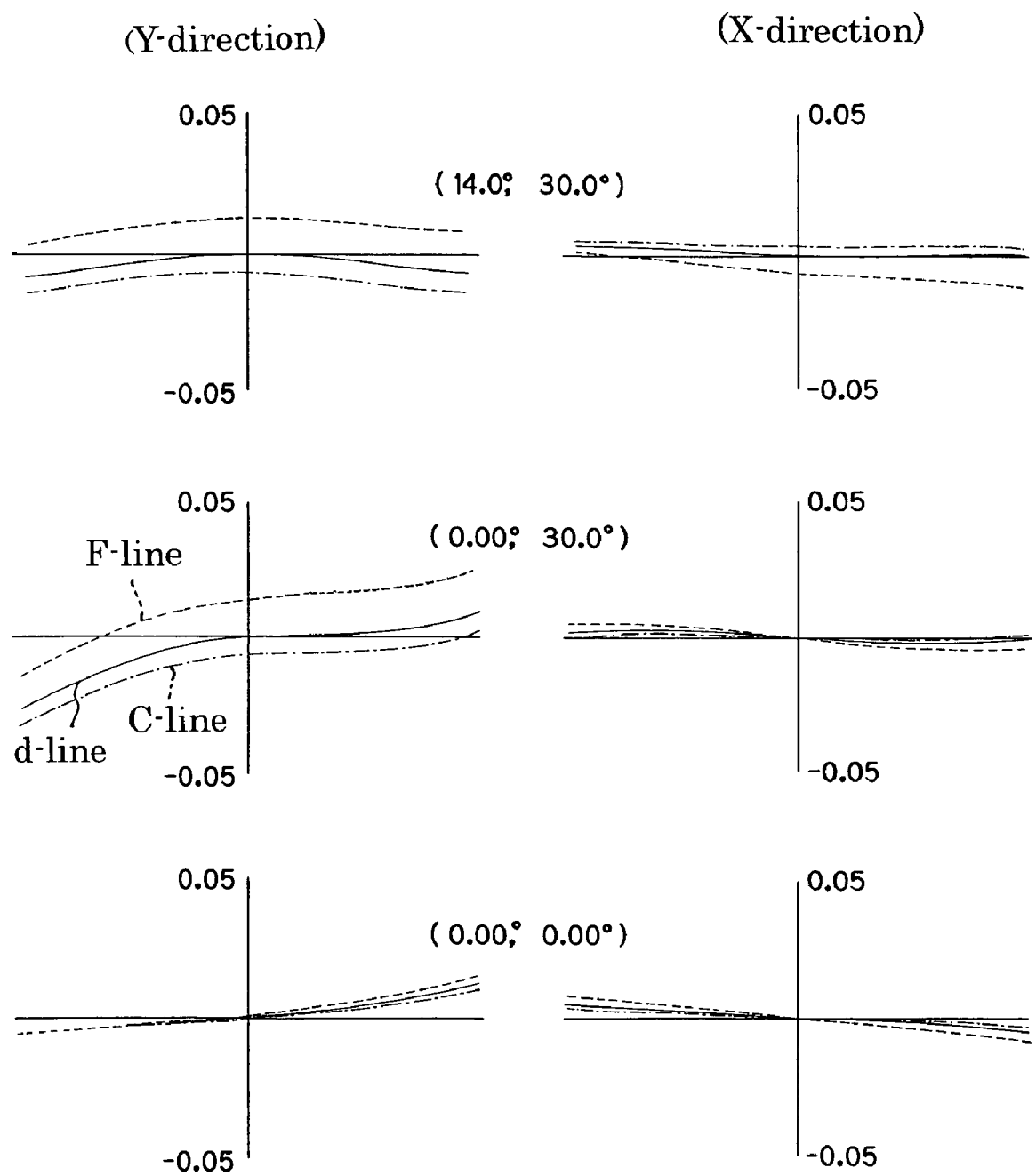
FIG. 12 is an aberration diagram for the optical systems according to Example 2.
Figure 13:
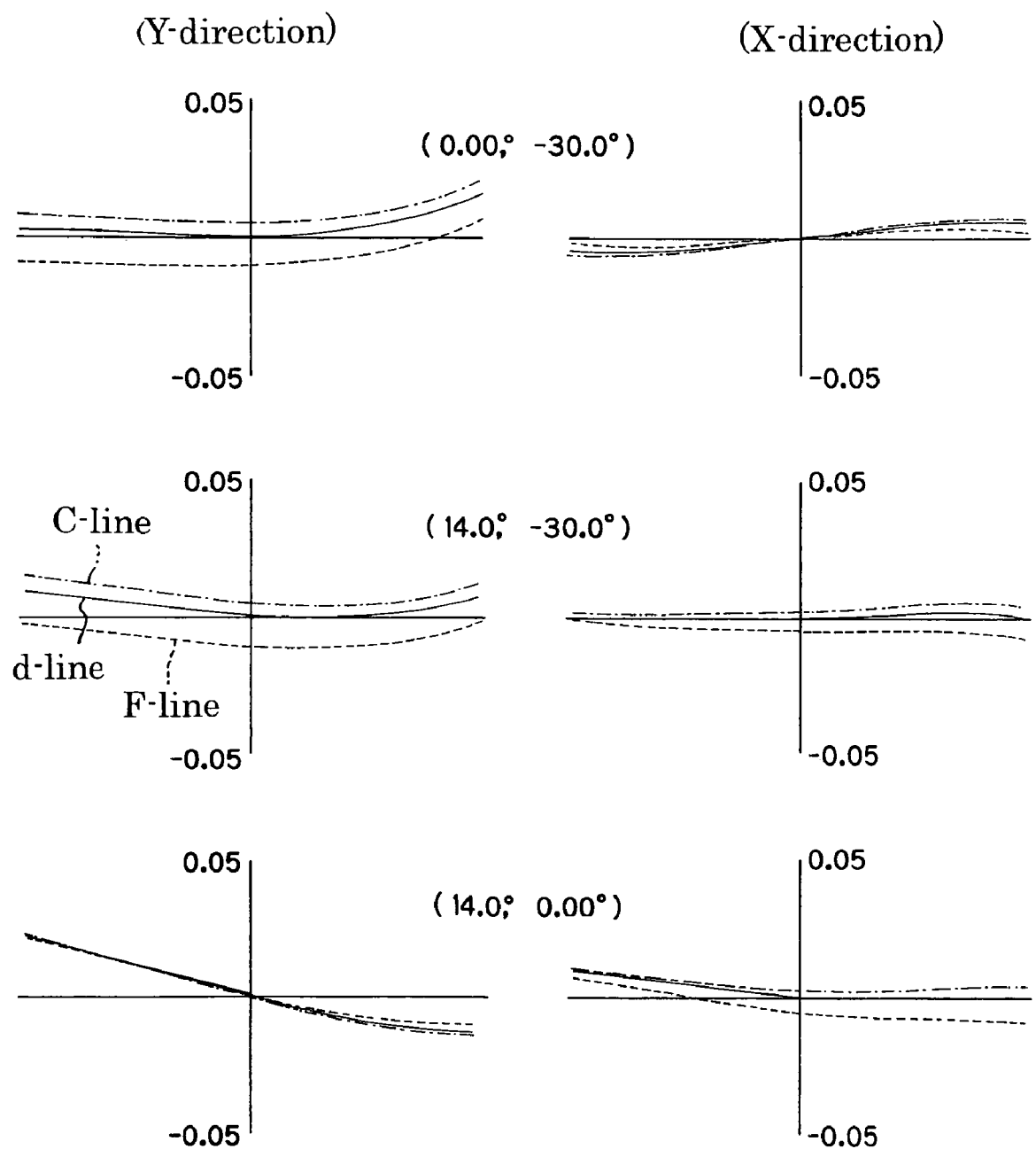
FIG. 13 is an aberration diagram for the optical systems according to Example 2.

Transverse aberrations of the optical systems 101 and 102 in Example 2 are shown in FIG. 12, and aberration diagrams of the optical system 103 in Example 2 are shown in FIG. 13.

The specifications of the optical systems in Example 2 are:
Angle of view: 33.4°×60.0°,
Entrance pupil diameter: ϕ1.9 mm,
F-number: 2.63 in the Y-Z plane,
2.71 in the X-Z plane,
Angle of view: 28°×60°,
Entrance pupil diameter: ϕ1.9 mm,
Focal length: 5.35 mm in the Y-Z plane,
5.42 mm in the X-Z plane, and
F-number: 2.82 in the Y-Z plane,
2.85 in the X-Z plane.

Figure 14:
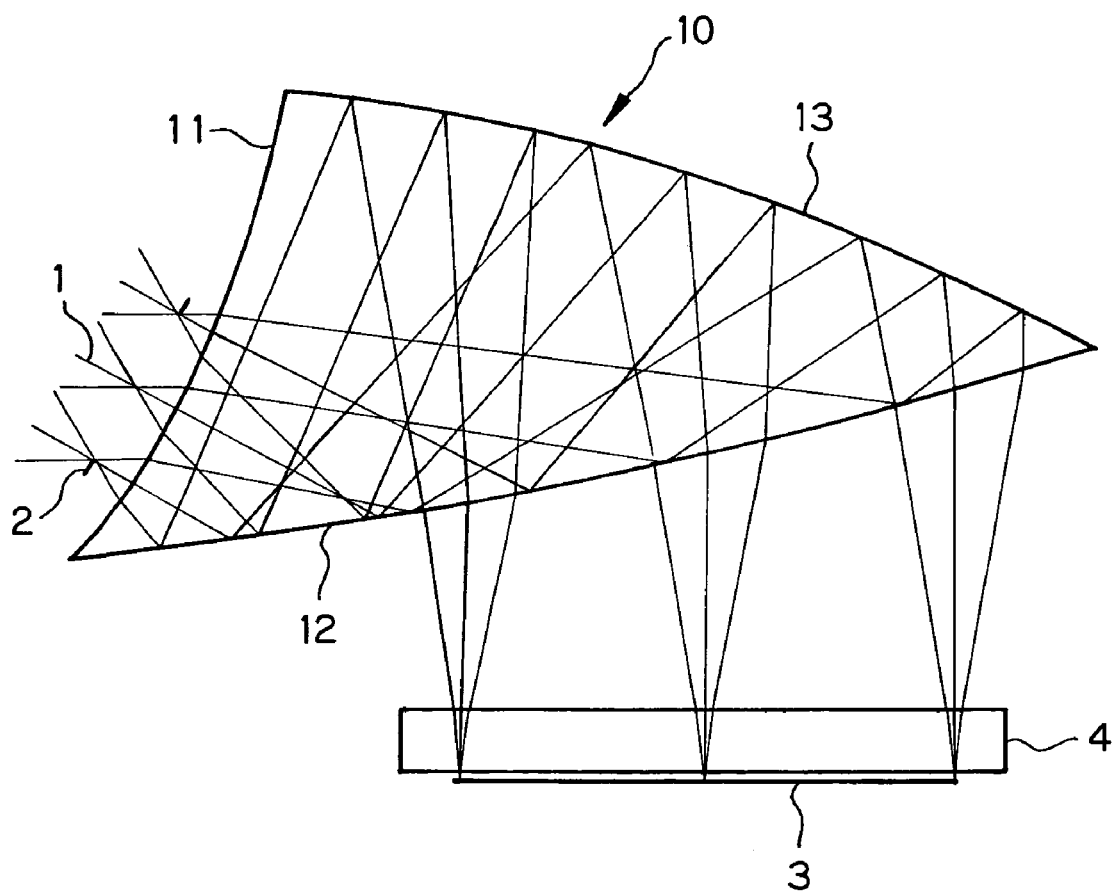
FIG. 14 is illustrative in section, as in FIG. 1, of the de centered prism system in Example 3 according to the invention.

FIG. 14 is illustrative in section, as in FIG. 1, of a decentered prism optical system 10 in Example 3 that may be used in place of the example of FIGS. 1 and 7. In Examples 1 and 2, each decentered prism optical system 10 is formed of glass; however, use may be made of plastics such as ZEONEX (registered trademark). The use of plastics could make the fabrication of curved surface shapes easy, contributing more to weight reductions, size reductions, and cost reductions as well. Mounts may be easy to form, too.

In Example 3 with constitutional parameters given later, there is a single prism provided wherein the decentered prism optical system 10 is designed of ZEONEX. Referring here to the optical system of FIG. 14, the decentered prism optical system 10 is located on an image side with respect to the aperture stop 2, and in front of the image plane 3 there is the cover glass 4 provided, as in FIG. 1. Just in front of the cover glass 4 there may be low-pass filters, infrared cut filters or other filters located. The decentered prism optical system 10 is constructed from a first transmitting surface 11 that is an entrance surface, a second reflecting plus transmitting surface 12 and a third transmitting surface 13. Light rays from an object through the aperture stop 2 transmit through the first surface 11, entering the medium. They are totally reflected off the second surface 12 and then reflected off the third surface 13. Through the second surface 12 this time, the light rays leave the decentered prism optical system 10, and then are imaged on the image plane through the cover glass 4.

And, this decentered prism optical system 10 may replace the decentered prism optical system 10 in each of the aforesaid examples.

Figure 15:
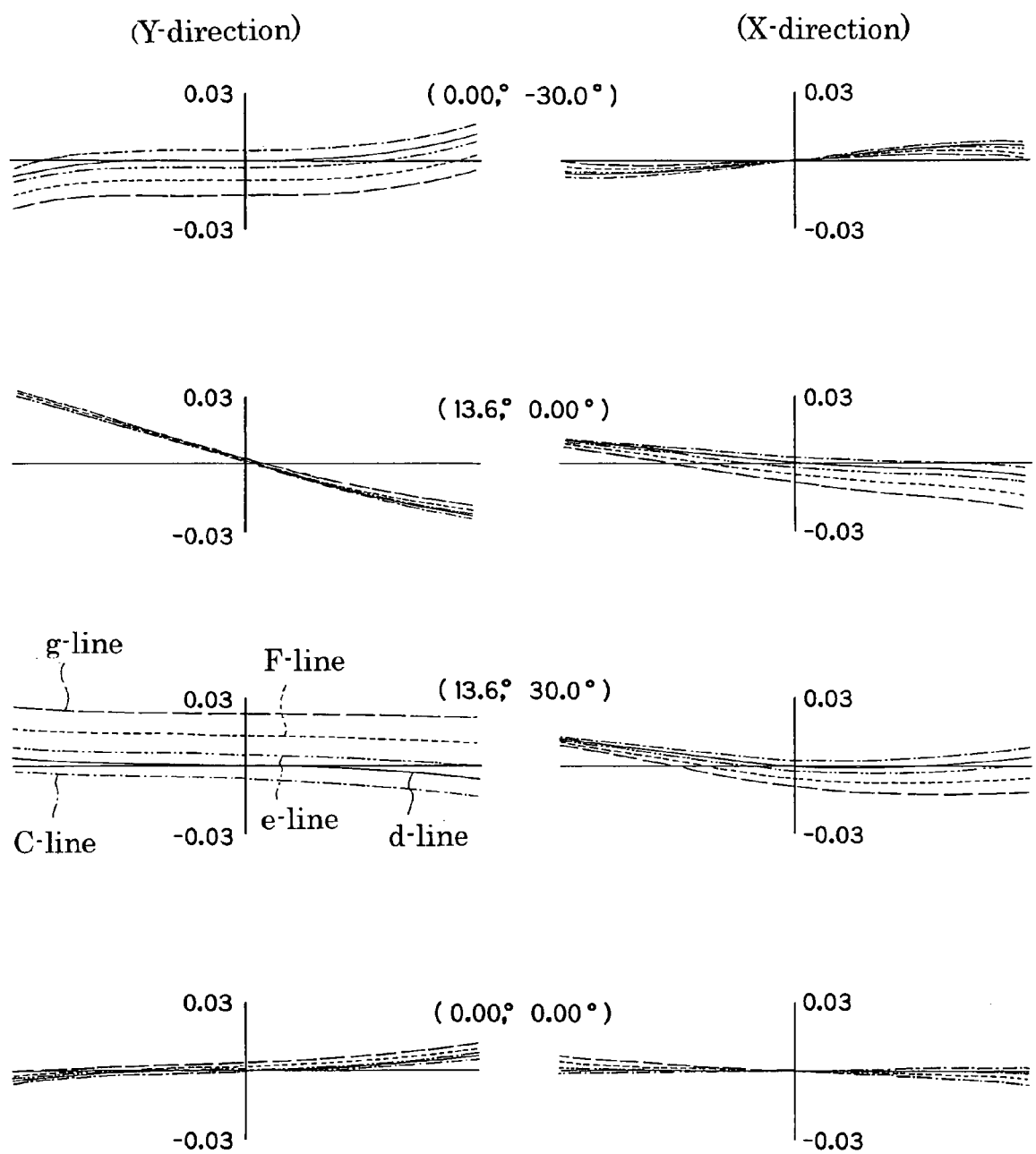
FIG. 15 is an aberration diagram for the decentered optical system according to Example 3.
Figure 16:
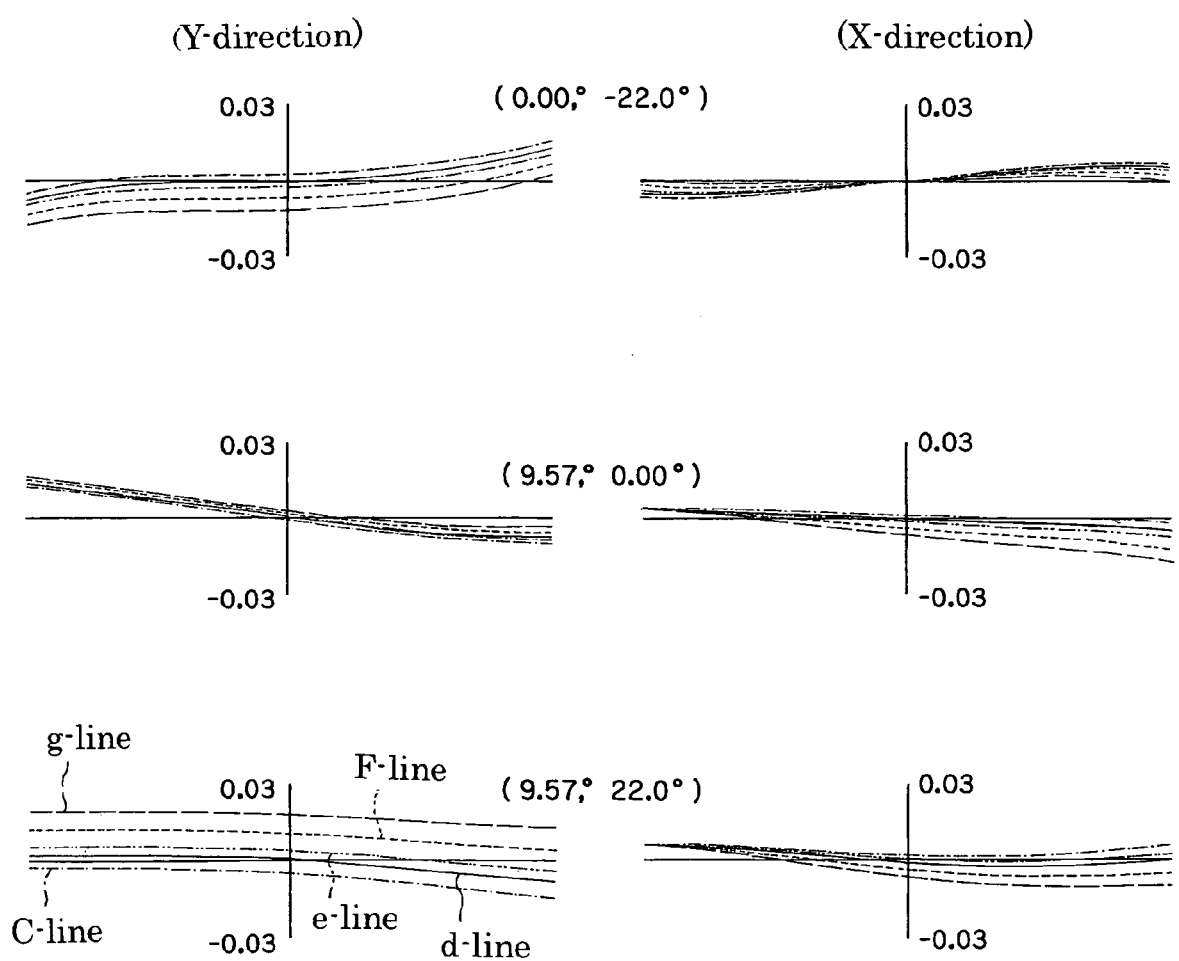
FIG. 16 is an aberration diagram for the decentered prism optical system according to Example 3.

Transverse aberrations of the decentered prism optical system 10 in Example 3 are shown in FIGS. 15 and 16.

In each of the aforesaid prisms, the reflecting plus transmitting surface should preferably be coated with an antireflection coating on an area with an angle of incidence at which an effective beam does not satisfy the total reflection condition in view of size reductions and making sure the quantity of light.

Set out below are the constitutional parameters in Examples 1, 2 and 3. In the following, "FFS" and "RS" stand for the free-form surface and the reflecting surface, respectively.

In Example 2, there are data provided about the optical system 103 adapted to take images of objects in the frontal direction. Data about the optical systems designed to take images of objects in the right and left directions are defined by those about portions after the stop surface.

It is noted that in the following data, "E-On where n is an integer" means "$\times 10^{-n}$".

EXAMPLE 1

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS[1] | | (1) | 1.8061 | 40.9 |
| 3 | FFS[2] (RS) | | (2) | 1.8061 | 40.9 |
| 4 | FFS[3] (RS) | | (3) | 1.8061 | 40.9 |
| 5 | FFS[2] | | (2) | | |
| 6 | ∞ | | (4) | 1.5163 | 64.1 |
| 7 | ∞ | | (5) | | |
| Image plane | ∞ | | (6) | | |

| FFS[1] | | | | | |
|---|---|---|---|---|---|
| $C_4$ | 2.63589E−02 | $C_6$ | −2.45467E−02 | | |

| FFS[2] | | | | | |
|---|---|---|---|---|---|
| $C_4$ | 1.76822E−02 | $C_6$ | −3.81278E−03 | $C_8$ | 4.79963E−04 |
| $C_{10}$ | −6.36704E−04 | $C_{11}$ | 1.33469E−04 | $C_{13}$ | −3.84617E−05 |
| $C_{15}$ | 1.33469E−04 | | | | |

| FFS[3] | | | | | |
|---|---|---|---|---|---|
| $C_4$ | 6.17856E−02 | $C_6$ | 4.49467E−02 | $C_8$ | 7.49630E−04 |
| $C_{10}$ | −1.69863E−03 | $C_{11}$ | 3.41790E−04 | $C_{13}$ | 3.08346E−04 |
| $C_{15}$ | 2.14444E−04 | | | | |

| Displacement and tilt(1) | | | | | |
|---|---|---|---|---|---|
| X | 0.00 | Y | 0.00 | Z | 0.31 |
| α | 8.10 | β | 0.00 | γ | 0.00 |

| Displacement and tilt(2) | | | | | |
|---|---|---|---|---|---|
| X | 0.00 | Y | 0.00 | Z | 1.80 |
| α | −44.87 | β | 0.00 | γ | 0.00 |

| Displacement and tilt(3) | | | | | |
|---|---|---|---|---|---|
| X | 0.00 | Y | 2.70 | Z | 2.04 |
| α | −72.98 | β | 0.00 | γ | 0.00 |

| Displacement and tilt(4) | | | | | |
|---|---|---|---|---|---|
| X | 0.00 | Y | 0.00 | Z | 3.85 |
| α | 120.00 | β | 0.00 | γ | 0.00 |

| Displacement and tilt(5) | | | | | |
|---|---|---|---|---|---|
| X | 0.00 | Y | −0.26 | Z | 4.00 |
| α | 120.00 | β | 0.00 | γ | 0.00 |

| Displacement and tilt(6) | | | | | |
|---|---|---|---|---|---|
| X | 0.00 | Y | −0.29 | Z | 4.02 |
| α | 120.00 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | ∞ | | | |
| 1 | ∞ | | | 1.8830 | 40.7 |
| 2 | ∞ (RS) | | (1) | 1.8830 | 40.7 |
| 3 | ∞ (RS) | | | 1.8830 | 40.7 |
| 4 | ∞ | | (2) | | |
| 5 | ∞ (Stop) | | (2) | | |
| 6 | FFS[1] | | (3) | 1.5254 | 56.2 |
| 7 | FFS[2] (RS) | | (4) | 1.5254 | 56.2 |
| 8 | FFS[3] (RS) | | (5) | 1.5254 | 56.2 |
| 9 | FFS[2] | | (4) | | |
| 10 | ∞ | | (6) | 1.5163 | 64.1 |
| 11 | ∞ | | (7) | | |
| Image plane | ∞ | | (8) | | |

| FFS[1] | | | | | |
|---|---|---|---|---|---|
| $C_4$ | 3.8526E−02 | $C_6$ | −1.5190E−02 | $C_8$ | 2.3213E−03 |
| $C_{10}$ | 1.2212E−03 | $C_{11}$ | −9.6851E−04 | $C_{13}$ | −8.8868E−03 |
| $C_{15}$ | 4.2411E−04 | | | | |

| FFS[2] | | | | | |
|---|---|---|---|---|---|
| $C_4$ | 1.6687E−02 | $C_6$ | −2.5943E−03 | $C_8$ | 1.7509E−03 |
| $C_{10}$ | −2.6184E−04 | $C_{11}$ | −1.1342E−04 | $C_{13}$ | −1.0013E−03 |
| $C_{15}$ | 3.9246E−05 | $C_{17}$ | 1.5339E−04 | $C_{19}$ | 7.3966E−05 |
| $C_{21}$ | −2.6502E−06 | $C_{22}$ | −9.2882E−05 | | |

| FFS[3] | | | | | |
|---|---|---|---|---|---|
| $C_4$ | 3.7531E−02 | $C_6$ | 2.6406E−02 | $C_8$ | 1.1735E−03 |
| $C_{10}$ | −4.4973E−04 | $C_{11}$ | 8.4195E−05 | $C_{13}$ | −1.7993E−04 |
| $C_{15}$ | 1.3866E−05 | $C_{17}$ | 2.3425E−05 | $C_{19}$ | −3.1411E−05 |
| $C_{21}$ | −1.8940E−06 | $C_{22}$ | −9.6268E−06 | | |

| Displacement and tilt(1) | | | | | |
|---|---|---|---|---|---|
| X | 0.00 | Y | 0.00 | Z | 6.00 |
| α | −30.00 | β | 0.00 | γ | 0.00 |

| Displacement and tilt(2) | | | | | |
|---|---|---|---|---|---|
| X | 0.00 | Y | 0.00 | Z | 1.00 |
| α | 60.00 | β | 0.00 | γ | 0.00 |

| Displacement and tilt(3) | | | | | |
|---|---|---|---|---|---|
| X | 0.00 | Y | 0.43 | Z | 1.25 |
| α | 63.78 | β | 0.00 | γ | 0.00 |

-continued

| | | Displacement and tilt(4) | | | |
|---|---|---|---|---|---|
| X | 0.00 | Y | 2.47 | Z | 2.42 |
| α | 9.56 | β | 0.00 | γ | 0.00 |
| | | Displacement and tilt(5) | | | |
| X | 0.00 | Y | 5.72 | Z | −1.38 |
| α | −18.55 | β | 0.00 | γ | 0.00 |
| | | Displacement and tilt(6) | | | |
| X | 0.00 | Y | 6.12 | Z | 4.53 |
| α | −180.00 | β | 0.00 | γ | 0.00 |
| | | Displacement and tilt(7) | | | |
| X | 0.00 | Y | 6.12 | Z | 5.23 |
| α | −180.00 | β | 0.00 | γ | 0.00 |
| | | Displacement and tilt(8) | | | |
| X | 0.00 | Y | 6.12 | Z | 5.33 |
| α | −180.00 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Stop) | | | | |
| 2 | FFS[1] | | (1) | 1.5254 | 56.2 |
| 3 | FFS[2] (RS) | | (2) | 1.5254 | 56.2 |
| 4 | FFS[3] (RS) | | (3) | 1.5254 | 56.2 |
| 5 | FFS[2] | | (2) | | |
| 6 | ∞ | | (4) | 1.5163 | 64.1 |
| 7 | ∞ | | (5) | | |
| Image plane | ∞ | | (6) | | |

| | | FFS[1] | | | |
|---|---|---|---|---|---|
| $C_4$ | 2.9153E−02 | $C_6$ | −3.3210E−02 | $C_8$ | −1.1064E−02 |
| $C_{10}$ | 3.2494E−03 | $C_{11}$ | −7.9992E−04 | $C_{13}$ | −6.5717E−03 |
| $C_{15}$ | −1.2360E−03 | | | | |
| | | FFS[2] | | | |
| $C_4$ | 1.4909E−02 | $C_6$ | −7.3377E−03 | $C_8$ | 1.7999E−03 |
| $C_{10}$ | 1.6023E−04 | $C_{11}$ | −1.4746E−05 | $C_{13}$ | −7.0329E−04 |
| $C_{15}$ | −9.6896E−06 | $C_{17}$ | 1.6670E−04 | $C_{19}$ | 4.3848E−05 |
| $C_{21}$ | −2.0032E−07 | $C_{22}$ | −6.8432E−05 | | |
| | | FFS[3] | | | |
| $C_4$ | 3.7482E−02 | $C_6$ | 2.1789E−02 | $C_8$ | 7.6168E−04 |
| $C_{10}$ | −6.0560E−04 | $C_{11}$ | 1.5484E−04 | $C_{13}$ | −1.5507E−04 |
| $C_{15}$ | 7.1352E−06 | $C_{17}$ | 3.5597E−05 | $C_{19}$ | −2.0547E−05 |
| $C_{21}$ | −5.5367E−06 | $C_{22}$ | −6.8122E−06 | | |

| | | Displacement and tilt(1) | | | |
|---|---|---|---|---|---|
| X | 0.00 | Y | 0.93 | Z | 0.40 |
| α | 8.19 | β | 0.00 | γ | 0.00 |
| | | Displacement and tilt(2) | | | |
| X | 0.00 | Y | −0.12 | Z | 2.74 |
| α | −49.75 | β | 0.00 | γ | 0.00 |
| | | Displacement and tilt(3) | | | |
| X | 0.00 | Y | 5.20 | Z | 4.54 |
| α | −79.64 | β | 0.00 | γ | 0.00 |
| | | Displacement and tilt(4) | | | |
| X | 0.00 | Y | 0.00 | Z | 7.09 |
| α | 120.00 | β | 0.00 | γ | 0.00 |
| | | Displacement and tilt(5) | | | |
| X | 0.00 | Y | −0.61 | Z | 7.44 |
| α | 120.00 | β | 0.00 | γ | 0.00 |
| | | Displacement and tilt(6) | | | |
| X | 0.00 | Y | −0.69 | Z | 7.49 |
| α | 120.00 | β | 0.00 | γ | 0.00 |

Figure 17:
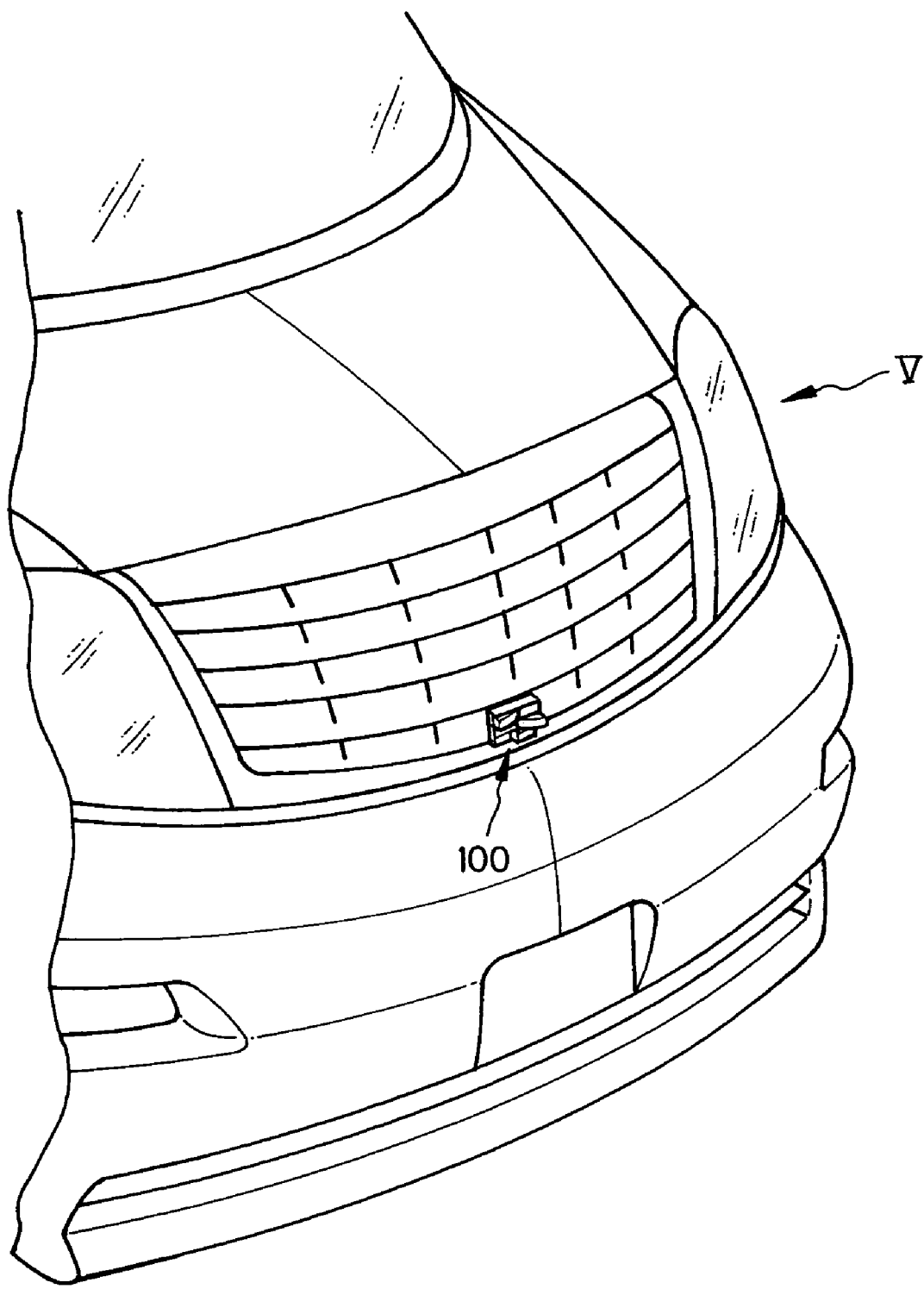
FIG. 17 is illustrative of the inventive imaging apparatus set up as monitors on both front sides of a motor vehicle.

The inventive imaging apparatus 100 capable of simultaneously taking images of objects in three directions, for instance, objects on the right and left, ahead, and ahead and down, may be used as a motor vehicle's front monitor that is mounted on the front end of the motor vehicle V, as shown in FIG. 17.

Alternatively, the inventive imaging apparatus may be used as a motor vehicle's rear or side monitor that is mounted on the rear end or the right or left side of the motor vehicle V.

Yet alternatively, it may be used for the imaging purpose of a drive recorder.

In each example, the imaging apparatus is designed to take images of objects in three directions; however, the light receiving area of the imaging plane may optionally be divided into four, five or ten directions.

Reference is now made to some features of the inventive imaging apparatus capable of taking images of objects in multiple directions and a vehicle equipped with it.

(Positioning)

The prism may be provided with an index used for positioning upon assembly, an engagement surface with a prism holder frame, and an attachment lug provided on an unavailable surface of the prism.

(Anti-Flaring)

The transmitting and reflecting surfaces of the prism should preferably be provided with an antireflection coating and a reflection coating, respectively. Partial application of such coatings to the reflecting and transmitting surfaces works for making sure the quantity of light. Specifically, a portion of this surface through which an effective beam transmits should preferably be coated with an antireflection coating, and a portion of the surface outside the effective beam portion of transmitting light beam and at which light is hardly totally reflected should preferably be coated with a reflection coating.

Of the surfaces of the prism, all but the portion through which the effective beam transmits may be sand polished and painted in black to help reduce the influences of inessential light rays.

In addition to painting the sides of the prism in black, a light block sheet may be inserted between the respective prisms.

The stop aperture may be configured into not only an ordinary circular shape but also an oval, rectangular, rhombic, octagonal or other shape. Especially if the stop aperture is configured into a shape having major and minor axis directions (e.g., an oval shape, and a rectangular shape with or without rounded corners), it is then easier to gain a sensible balance between making sure the quantity of light and limiting inessential light more likely to result in flare light. If stop size at the plane including the axial chief ray is smaller than stop size in the vertical direction to that, i.e., stop size in the direction of stacking the prisms up, it is then easier to offer a sensible tradeoff between making sure the quantity of light and limiting inessential light.

(Modification to the Powerless Prism)

The powerless prism of Example 2 for taking images of objects right in front may have negative power so that images in wider angles can be taken. In that case, the areas of the obtained images tending to overlap grow wider so that the images can easily be synthesized or where objects are can easily be discerned.

With the apparatus designed to take images of objects in the three directions in each example, there are some merits:
1. because the field of view is broken down into three directions, it is possible to take images of objects in a wider field of view;
2. even when compared with a fisheye lens capable of taking images of objects in a wide field of view, image deformation on the imaging plane can easily be so held back that variations in the amount of information depending on the direction of objects can be reduced, working for image processing as well;
3. the whole apparatus can be downsized;
4. the inventive imaging apparatus differs in appearance from usual cameras (e.g., surveillance cameras) so that stresses on those who are to be watched can be lessened; and
5. optical members and light-receiving members can easily be assembled together during production, leading to low costs.

The inventive apparatus may be used in, for instance,
1. onboard applications;
2. surveillance and security applications; and
3. a number of other applications.

(Onboard Applications)

Exemplary onboard applications include 1. visual checking of blind spots, 2. checking of obstacles, pedestrians or the like, 3. checking of lanes or traffic signs, and 4. monitoring of drivers inside or the like.

(Visual Checking of Blind Spots)

For blind spot checking, possible checking is performed of objects in front of, in the rear of, and on the right and left of a motor vehicle, and below the front bumper of the vehicle, etc. For instance, it is possible to perform monitoring in such a way as to compensate for blind spots resulting from the right and left chasses of the front window shield and side mirrors.

The imaging apparatus according to each example of the invention may be mounted on the front or rear or, on the right and left of, the vehicle body.

If a plurality of optical systems are attached to one apparatus to make sure an imaging angle of 270°, it can then get rid of blind spots all around the vehicle only by attaching them to the left-front corner and right-rear corner of the vehicle.

The images taken may be displayed on a monitor inside, or a head-mount type image display may be used to permit a driver to check up images of objects in blind spots.

Alternatively, images of objects in blind spots may be projected through a projector onto the interior of the vehicle.

When the imaging apparatus is used for checking up objects in the rear of the vehicle body, it may then be attached to as high a position of the vehicle body as possible so that images of objects obliquely down can be taken to facilitate checking up objects in the rear of it while on parking.

Images of the wheels may also be taken to monitor their state thereby controlling the vehicle.

The imaging apparatus may be mounted at the right and left rears of a vehicle to monitor the rear quarter thereby making sure safety during driving.

The imaging apparatus may be equipped with a directional microphone such as a stereo microphone to deliver audio information to a driver.

A speaker may be built in the imaging apparatus to give a warning to a driver inside or outside.

In addition to general vehicles, this type of surveillance may be applied to work vehicles likely to give rise to blind spots.

The inventive imaging apparatus may be slimmed down: it can be buried in a vehicle body and covered with smoked glass or half-silvered mirror coating to get rid of unnatural appearance.

If the imaging apparatus is used to pick up infrared radiation to make sure improved visibility in the night time and in the case of rain.

If one of the fields of view observed is set obliquely up on a road surface, it is then also possible to keep in vision signals in the direction of travel, for instance. When such functions are given to the inventive imaging apparatus, it may be built in a door mirror and positioned in an orientation of making sure long imaging fields of view in the vertical direction.

The inventive imaging apparatus may be located in a position to keep watch over the bottom side of a vehicle.

When the inventive imaging apparatus is attached to a vehicle or the like, it is preferable that a resilient member such as a rubber one is attached to it to keep the vehicle from vibrations thereby absorbing impacts to the apparatus.

Images may be processed in such a way as to cancel out their shakes due to the vibrations of a vehicle or, alternatively, the orientation of the apparatus may be tweaked in such a way as to cancel out shakes by an ultrasonic motor or the like.

In the embodiment of the invention here, the taking angle of view can be kept wide with an increase in the depth of field, so that the prisms can be combined integrally with the imaging device.

It goes without saying that focusing may be implemented by changing the distance between the prisms and the imaging device. The respective prisms may move independently to implement focusing for each taking direction, and lenses, liquid crystal lenses or the like moving upon focusing may be provided in the respective optical systems.

Any of the prisms may vary in the taking direction by movement.

(Checking of Obstacles, Pedestrians or the Like)

When the inventive imaging apparatus is used to check up obstacles or pedestrians, it may be used in the form of an imaging apparatus for drive recorder or other purposes to record the number of a car running into the vehicle from behind, or a car-to-car sensor. The inventive imaging apparatus may be used to check up whether or not a road ahead is frozen or has a puddle so that the speed of a vehicle can automatically be controlled.

The frozen road surface or puddles appear to be capable of being seen by way of changes of the angle of incidence of light rays due to brightness. The use of a polarizing filter would make it easy for an operator to turn to puddles.

If a plurality of the inventive imaging apparatus having a taking angle of view of about 180° are located in front of a vehicle at an interval to overlap all or a part of the directions of the images of objects to be taken, it is then possible to obtain images having parallaxes thereby improving the function of finding ranges. This also makes it easy to detect whether or not a road ahead is frozen or there are puddles ahead.

The inventive imaging apparatus may be mounted on a plurality of vehicles for transfer of information between vehicles ahead, behind and on the right and left so that information about traffic jams, accidents or the like in the direction of travel can be exchanged between them When the inventive imaging apparatus is used as an inside monitor, it helps monitor the eyelids of a driver, thereby keeping watch over dozing off at the wheel and giving a warning to the driver if it happens.

For instance, the inventive imaging apparatus may be located on a driver side with respect to a room mirror inside to monitor the driver's face and the direction of travel.

The inventive imaging apparatus may be built in the room mirror to keep watch inside or outside.

When the inventive imaging apparatus is used for keeping watch inside, it is possible to keep watch over the driver or the like inside over a half-silvered mirror applied to the reflecting surface of the room mirror.

When the inventive imaging apparatus is used for keeping watch outside, it may be covered with a semi-transparent cover in a less noticeable fashion.

The inventive imaging apparatus may be integral with the room mirror so that adjustment of the room mirror by the driver naturally leads to surveillance of the direction of the driver.

On the other hand, when the inventive imaging apparatus is used for keeping watch outside, the direction of taking images remains invariable irrespective of adjustment of the room mirror.

If the inventive imaging apparatus is attached to the ceilings of taxies, buses, electric cars and aircrafts, it may work as a security camera for keeping watch over passenger rooms, doors or their surroundings, cockpits or the like and recording images there.

(Surveillance/Security Applications)

In surveillance and security applications, the inventive imaging apparatus may be located not only in carriers such as vehicles but also at crossroads to keep watch over roads and at stations' platforms to keep watch over the platforms.

The inventive imaging apparatus may also be used for keeping watch over stores inside and outside, cash dispensers, automatic venders, play machines at play spots, and for security purposes as well.

If the inventive imaging apparatus is located in doors of rooms and entrances in hotels and what goes on outside the doors is shown inside, it then provides a security camera or security doorphone.

If the inventive imaging apparatus is placed in a room, it may then be used for keeping watch inside.

With a field of view of about 180°, the inventive imaging apparatus may be used for keeping watch over, for instance, the insides of long corridors or tunnels, and production lines in factories. It may then take images of objects coming close or going away.

A hidden field of view may be provided to the inventive imaging apparatus to keep it less noticeable, or the inventive imaging apparatus may be inserted in some gaps.

(Other Applications)

Set out below are possible other applications.

The inventive imaging apparatus is used to take images having a wide angle of view in one direction: it may be attached to the helmet of a motor cycle driver so that it is used for observation of images from a remote position or as a drive recorder.

The inventive imaging apparatus may be built in portable modules such as cellular phones having cameras, toy cameras, capsule endoscopes, hard endoscopes, POS systems for stock managements, camera systems for TV conferences, personal computers and eyes of robots to take images of objects in multiple directions.

Besides, the inventive imaging apparatus may be used in variety of other applications including game machines capable of taking images of objects in multiple directions, monitors for bowlers at bowling alleys and golf players at golf practice ranges, and monitors that float on the water, keeping watch over the signs of fishes in the water.

(Smear Preventives)

When the inventive imaging apparatus is used to take images of objects out of doors like in onboard applications, the sunlight enters the imaging plane of the imaging device, possibly giving rise to smears in the taken images. To prevent such smears, a filter for reducing the quantity of light (ND filter) may be mounted on a part of the imaging device.

Instead of this filter, a liquid crystal shutter, a photochromic device or the like may be used to make transmittance variable.

There may also be a filter used that has a transmittance decreasing as it draws closer to the upper position of each screen.

Filters may be interchanged for each screen; for instance, there is no ND filter used with the imaging apparatus adapted to take images of objects in the down direction. The filter may be attached not only to the imaging device but also to the entrance window of each imaging optical system. For each entrance window, use may be made of different filters depending on the purpose (for instance, filters having different limiting areas like a visible light transmitting filter and an infrared radiation transmitting filter, and ND filters having different transmittances).

For the stop, there may a variable stop used that varies in aperture size depending on the intensity of incident light. When, of images received on the imaging device, there are ones exceeding the predetermined dynamic range, the stop in the optical system associated with them may be stopped down.

(Prevention of Waterdrops)

Preferably, there is a cover provided for the purpose of protecting the imaging apparatus. This works more for prevention of clouding resulting humidity, and damages due to impinging matters.

The cover is then preferably configured such that there is no shading of light beams in the imaging field of view.

For instance, the cover may be configured into a spherical, not hemispherical, shape, or it may be configured into a trapezoidal shape in section that helps avoid shading in the respective imaging directions.

Preferably, that cover is preferably provided with a water-repellent coating or processed finely on the surface, thereby making waterdrops less likely to deposit on it.

Alternatively, it is preferable to apply a coating to the cover that turns waterdrops into a film, thereby holding back optical influences.

When there are waterdrops on the cover, they could be shaken off if that cover is vibrated by an ultrasonic motor or the like.

Preferably, the whole apparatus is tightly closed up with dried air or nitrogen or drying agents such as silica gel filled in it, thereby preventing the occurrence of waterdrops inside.

A heater such as an electric heating wire may be applied to the imaging apparatus for prevention of water condensation.

Alternatively, heat generating from the imaging device may be used for prevention of water condensation.

I claim:

1. An imaging apparatus adapted to take images of objects in a plurality of directions, comprising:
   a single imaging device, and
   at least three imaging optical systems located in juxtaposition to form at least three images on an imaging plane of said single imaging device in different imaging directions, wherein:
   of said at least three imaging optical systems, at least two each comprise a curved reflecting surface of concave shape that reflects light rays from objects in a right-and-left direction intersecting a direction of juxtaposition of said juxtaposed optical systems;

said at least three imaging optical systems include a first imaging optical system, a second imaging optical system and a third imaging optical system; and the first imaging optical system, the second imaging optical system and the third imaging optical system are positioned such that:

a first axial chief ray exiting out from the first imaging optical system arrives at the imaging device not via the second imaging optical system and the third imaging optical system, a second axial chief ray exiting out from the second imaging optical system arrives at the imaging device not via the first imaging optical system and the third imaging optical system, and a third axial chief ray exiting out from the third imaging optical system arrives at the imaging device not via the first imaging optical system and the second imaging system.

2. The imaging apparatus according to claim 1, wherein said curved reflecting surfaces of concave shape in said at least two imaging optical systems are each in an irrotational symmetric, aspheric shape.

3. The imaging apparatus according to claim 1, wherein said at least two imaging optical systems each have a plurality of reflecting surfaces.

4. The imaging apparatus according to claim 1, wherein said at least two imaging optical systems each have a plurality of curved reflecting surfaces.

5. The imaging apparatus according to claim 4, wherein said plurality of curved reflecting surfaces in said two imaging optical systems are each in an irrotational symmetric, aspheric shape.

6. The imaging apparatus according to claim 3, wherein said at least two imaging optical systems each have a prism having said plurality of reflecting surfaces.

7. The imaging apparatus according to claim 6, wherein said prisms in said at least two imaging optical systems each comprise, in order from an object side along an axial chief ray toward an image plane, a first surface having transmitting action, a second surface having internal reflecting plus transmitting action, and a third reflecting surface having reflecting action;

said prisms are each formed of a medium having a refractive index of 1.45 or greater; and said axial chief ray enters the medium through said first surface, is reflected off said second surface, then off said third surface, and then leaves the medium through said second surface.

8. The imaging apparatus according to claim 7, wherein said at least two imaging optical systems each comprise an aperture stop located on an object side of said first surface of said prism.

9. The imaging apparatus according to claim 1, wherein the reflecting surfaces in said at least two imaging optical systems are tilted with respect to the axial chief ray such that a plane including the axial chief ray is vertical to the direction of juxtaposition of said at least three imaging optical systems.

10. The imaging apparatus according to claim 1, wherein said at least two imaging optical systems are of the same shape, and one imaging optical system is flipped with respect to another with an axis vertical to the imaging plane of the imaging device as an axis of symmetry.

11. The imaging apparatus according to claim 1, wherein of said at least three imaging optical systems, at least one is adapted to reflect an axial chief ray from an object in a direction between imaging directions of said at least two imaging optical systems, and said at least one imaging optical system comprises a curved reflecting surface of concave shape.

12. The imaging apparatus according to claim 1, wherein said at least one imaging optical system is adapted to take an image of an object in a direction vertical to said imaging plane.

13. The imaging apparatus according to claim 11, wherein said at least one imaging optical system comprises a prism that is located in front of the imaging plane and has said curved reflecting surface;

said prism in said at least one imaging optical system is located in the same orientation as any one of said at least two imaging optical systems is located; and said at least one imaging optical system comprises a reflecting surface that is located on an object side with respect to said prism and reflects light rays.

14. The imaging apparatus according to claim 13, wherein said at least one imaging optical system comprises a prism that is located in front of the imaging plane and has said curved reflecting surface;

said prism in said at least one imaging optical system is located in the same orientation as any one of said at least two imaging optical systems is located;

said at least one imaging optical system comprises a reflecting member that is located on an object side with respect to said prism and reflects light rays;

said reflecting member comprises a fourth surface having transmitting and internal reflecting action, a fifth surface having reflecting action, and a sixth surface having transmitting action; and said axial chief ray enters the medium through said fourth surface, is reflected off said fifth surface, then off said fourth surface, and then leaves the medium through said sixth surface.

15. The imaging apparatus according to claim 13, wherein said prisms in said at least one imaging optical system comprises, in order from an object side along an axial chief ray toward an image plane, a first surface having transmitting action, a second surface having internal reflecting plus transmitting action, and a third reflecting surface having reflecting action;

said prism in said at least one imaging optical system is formed of a medium having a refractive index of 1.45 or greater; and said axial chief ray enters the medium through said first surface, is reflected off said second surface, then off said third surface, and then leaves the medium through said second surface.

16. The imaging apparatus according to claim 13, wherein there is an additional imaging optical system located in a different orientation between said at least one imaging optical system and an imaging optical system located in the same orientation as it is located.

17. The imaging apparatus according to claim 12, wherein an imaging field of view set by said at least two imaging optical systems is linked to an imaging field of view of said at least one imaging optical system.

18. The imaging apparatus according to claim 11, wherein said at least one imaging optical system is adapted to form an image of an object in a direction that is tilted in the direction of juxtaposition of said at least three imaging optical systems with respect to a direction vertical to said imaging plane.

19. The imaging apparatus according to claim 18, wherein said at least three imaging optical systems are all identical, and wherein said at least one imaging optical system is located in a different orientation from orientations of said at least two imaging optical systems.

20. The imaging apparatus according to claim 1, wherein said at least three imaging optical systems are provided with a light block member inserted between them that blocks off light rays from the adjacent imaging optical system or systems.

21. A vehicle, comprising:
a vehicle body, and
an imaging apparatus as recited in claim 1, which is attached to a front portion of said body.

22. A vehicle, comprising:
a vehicle body, and
an imaging apparatus as recited in claim 1, which is attached to said body.

* * * * *